(12) United States Patent
Reimer

(10) Patent No.: US 12,681,626 B2
(45) Date of Patent: Jul. 14, 2026

(54) GRID STRUCTURE CONTROL IN DIGITAL CONTENT

(71) Applicant: Adobe Inc., San Jose, CA (US)

(72) Inventor: Justin Aaron Reimer, Seattle, WA (US)

(73) Assignee: Adobe Inc., San Jose, CA (US)

( * ) Notice: Subject to any disclaimer, the term of this patent is extended or adjusted under 35 U.S.C. 154(b) by 263 days.

(21) Appl. No.: 18/538,802

(22) Filed: Dec. 13, 2023

(65) Prior Publication Data

US 2025/0053285 A1 Feb. 13, 2025

Related U.S. Application Data

(60) Provisional application No. 63/518,502, filed on Aug. 9, 2023.

(51) Int. Cl.
| | |
|---|---|
| *G06F 3/04845* | (2022.01) |
| *G06F 3/04842* | (2022.01) |
| *G06F 30/12* | (2020.01) |
| *G06F 111/04* | (2020.01) |

(52) U.S. Cl.
CPC ...... *G06F 3/04845* (2013.01); *G06F 3/04842* (2013.01); *G06F 30/12* (2020.01); *G06F 2111/04* (2020.01)

(58) Field of Classification Search
CPC .................................................. G06F 3/04845
USPC .......................................................... 715/762
See application file for complete search history.

(56) References Cited

U.S. PATENT DOCUMENTS

| | | | | |
|---|---|---|---|---|
| 8,584,034 B2 * | 11/2013 | Holt | ...................... | G06F 3/0482 |
| | | | | 715/214 |
| 9,626,067 B2 * | 4/2017 | Hogan | .................. | G06F 40/177 |
| 10,008,077 B2 * | 6/2018 | Shiraishi | ............. | G07F 17/3269 |
| 10,175,874 B2 * | 1/2019 | Treskunov | ............. | G06F 3/033 |
| 10,254,909 B2 * | 4/2019 | Eskander | ............. | G06F 3/0481 |
| 11,216,874 B2 * | 1/2022 | James | .................... | G06Q 40/04 |
| 2006/0061776 A1 * | 3/2006 | Chen | ..................... | G06F 40/171 |
| | | | | 358/1.1 |
| 2006/0150078 A1 * | 7/2006 | Brookler | .............. | G06F 40/103 |
| | | | | 715/228 |
| 2008/0115081 A1 * | 5/2008 | Sankaravadivelu | .. | G06F 3/0481 |
| | | | | 715/783 |

(Continued)

OTHER PUBLICATIONS

Reimer, Justin Aaron, et al., "Pursuant to MPEP § 2001.06(b) the applicant brings the following co-pending application to the Examiner's attention:", U.S. Appl. No. 63/518,502, filed Aug. 9, 2023, 79 pages.

(Continued)

*Primary Examiner* — Reza Nabi
(74) *Attorney, Agent, or Firm* — FIG. 1 Patents

(57) ABSTRACT

Grid structure control techniques and systems are described that support use of a flexible grid structure and layout control. In an implementation, an input is received via a user interface, the user interface displaying a grid having a plurality of grid cells. A determination is made as to whether the input corresponds to a first said grid cell of the grid. Responsive to determining by a processing device the input corresponds to the first said grid cell, a first edge of the first grid cell and a second edge of a second grid cell is moved as following the input. The second edge is disposed opposite and proximal to the first edge.

20 Claims, 17 Drawing Sheets

(56) References Cited

U.S. PATENT DOCUMENTS

| 2009/0040240 | A1* | 2/2009 | Grotjohn | G06F 40/18 |
| | | | | 345/689 |
| 2013/0227413 | A1* | 8/2013 | Thorsander | G06F 3/0482 |
| | | | | 715/841 |
| 2013/0227454 | A1* | 8/2013 | Thorsander | G06F 40/166 |
| | | | | 715/767 |
| 2013/0227482 | A1* | 8/2013 | Thorsander | G06F 3/04886 |
| | | | | 715/810 |
| 2013/0227483 | A1* | 8/2013 | Thorsander | G06F 3/0488 |
| | | | | 715/821 |
| 2013/0227490 | A1* | 8/2013 | Thorsander | G06F 3/04883 |
| | | | | 715/841 |
| 2013/0239049 | A1* | 9/2013 | Perrodin | H04N 1/00453 |
| | | | | 715/781 |
| 2014/0372916 | A1* | 12/2014 | Dollon | G06F 9/451 |
| | | | | 715/765 |
| 2015/0074504 | A1* | 3/2015 | Steinfl | H04L 51/52 |
| | | | | 715/202 |
| 2015/0134477 | A1* | 5/2015 | Ortolani | G06Q 30/0633 |
| | | | | 705/26.8 |
| 2016/0041963 | A1* | 2/2016 | Coblenz | G06F 40/18 |
| | | | | 715/227 |
| 2017/0075505 | A1* | 3/2017 | Tijssen | G06F 40/18 |
| 2017/0147716 | A1* | 5/2017 | Shirabe | G06F 30/13 |
| 2020/0348809 | A1* | 11/2020 | Drescher | G06F 3/0482 |
| 2020/0379631 | A1* | 12/2020 | Karlsson | G06F 3/04842 |
| 2021/0150489 | A1* | 5/2021 | Haramati | G06F 16/252 |
| 2021/0150670 | A1* | 5/2021 | Arora | G06T 3/608 |
| 2021/0157978 | A1* | 5/2021 | Haramati | G06F 7/14 |
| 2024/0127552 | A1* | 4/2024 | Laurent | G06F 3/167 |
| 2025/0053693 | A1* | 2/2025 | Yang | G06F 3/04845 |

OTHER PUBLICATIONS

Yang, Weizhi , "Pursuant to MPEP § 2001.06(b) the applicant brings the following co-pending application to the Examiner's attention:", U.S. Appl. No. 18/538,834, filed Dec. 13, 2023, 70 pages.

* cited by examiner

200

300

302

Grid Structure Control Module 116

Mode Determination Module 206

Divider Edit Mode Module 208

Grid Cell Edit Mode Module 210

304

Figure 4:
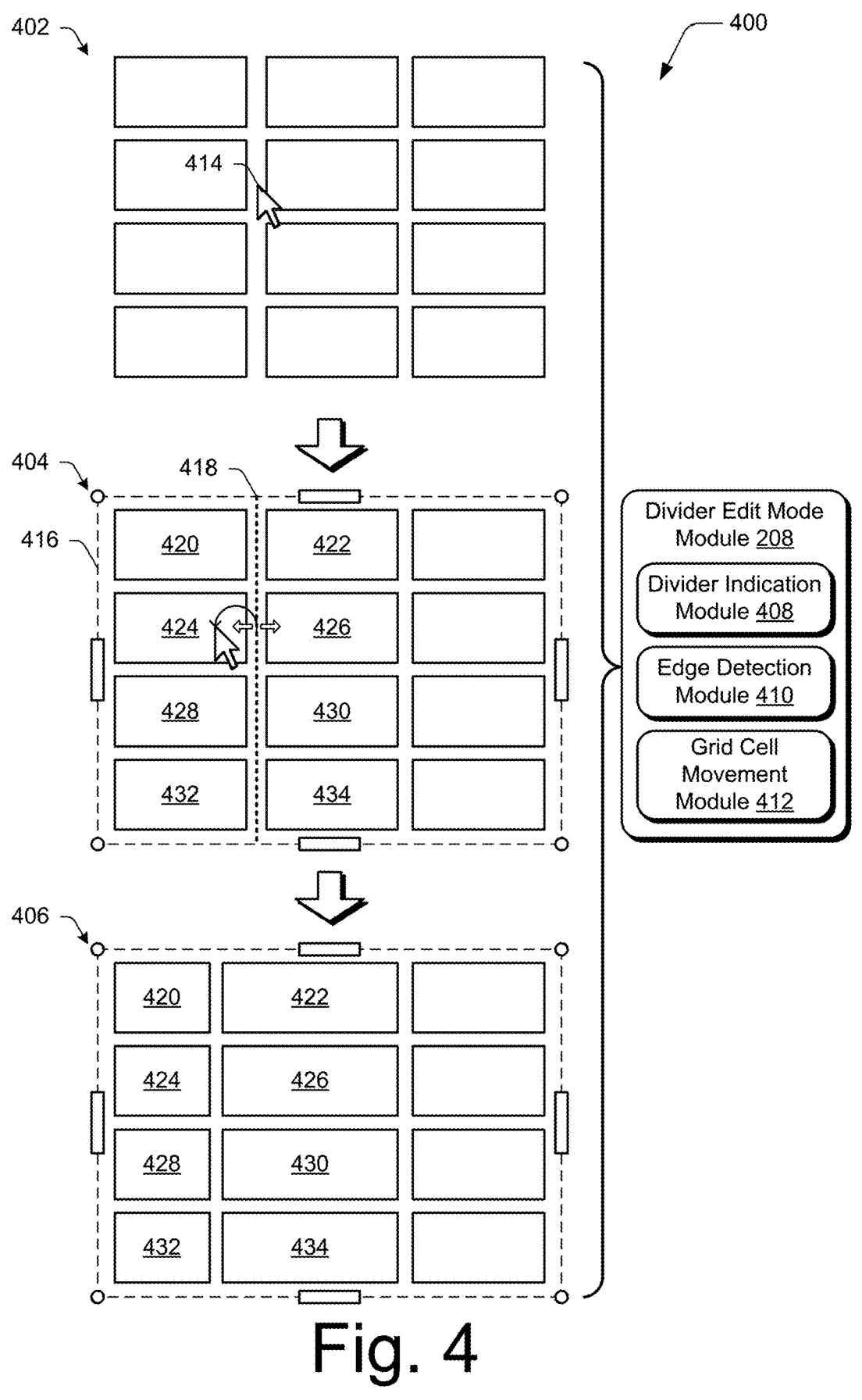

402

400

414

404

418

416

420    422

424    426

428    430

432    434

406

420    422

424    426

428    430

432    434

Divider Edit Mode
Module 208

Divider Indication
Module 408

Edge Detection
Module 410

Grid Cell
Movement
Module 412

Figure 5:
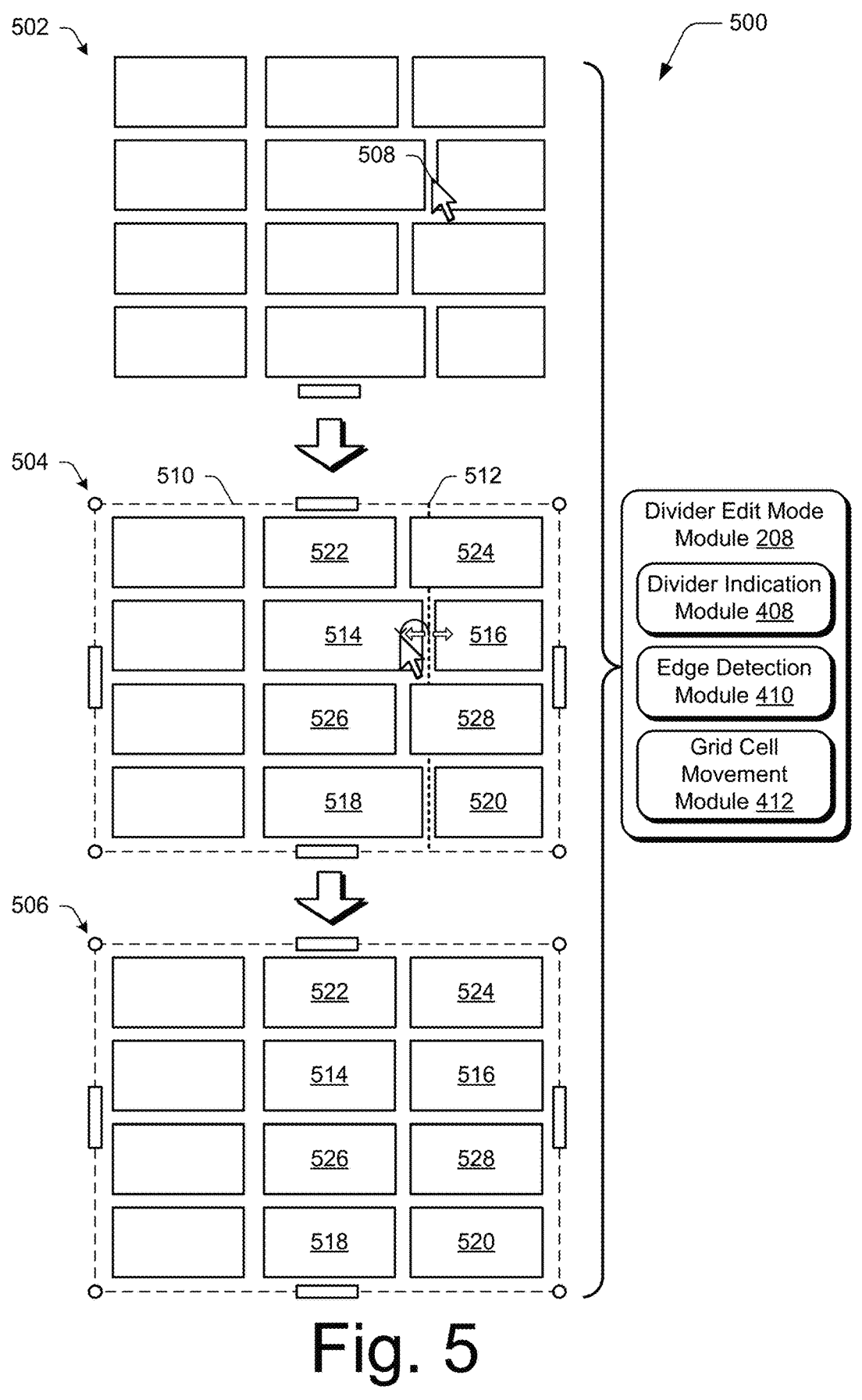

Divider Edit Mode
Module 208

Divider Indication
Module 408

Edge Detection
Module 410

Grid Cell
Movement
Module 412

Figure 8:
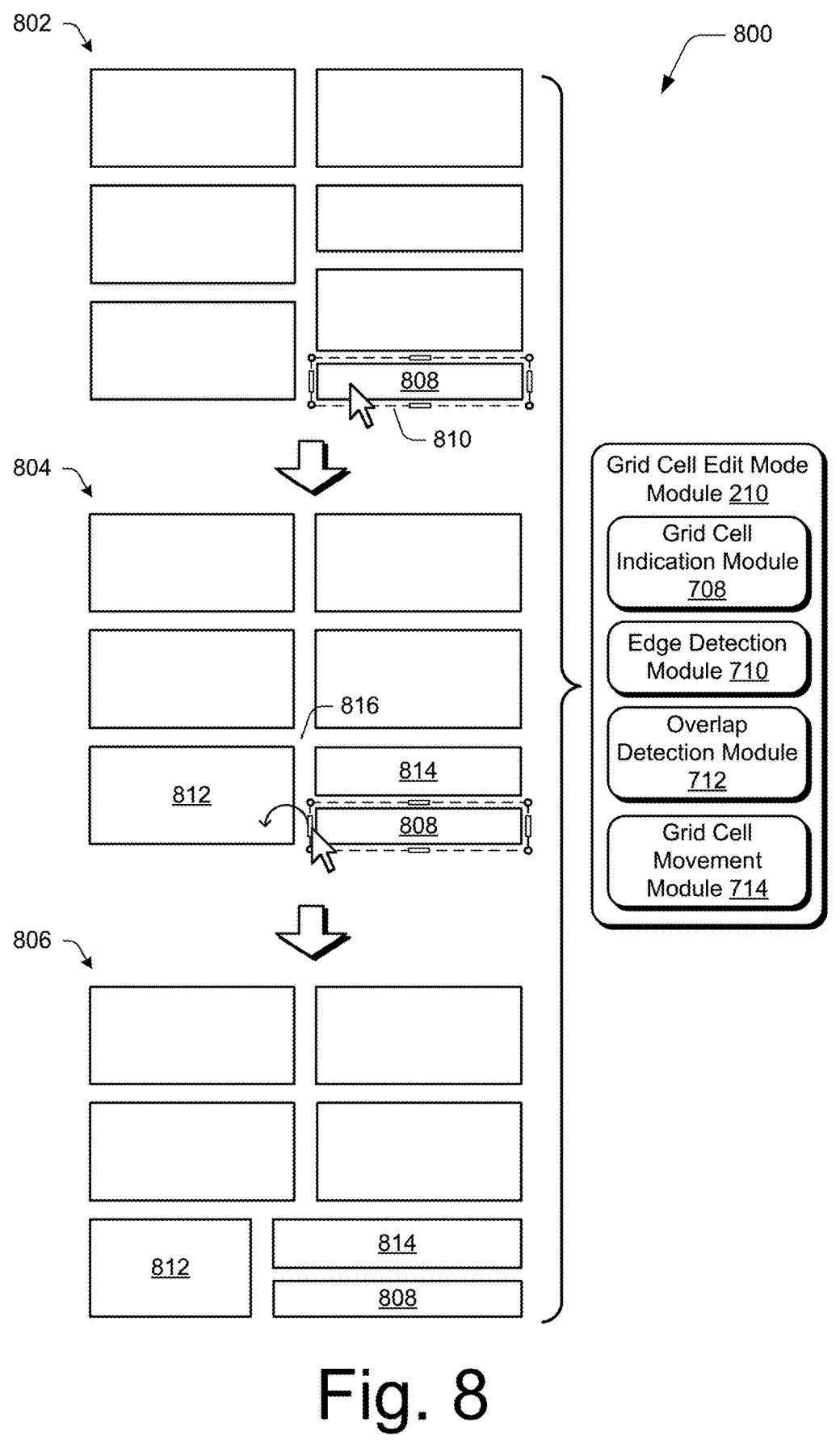

Grid Cell Edit Mode
Module 210

Grid Cell
Indication Module
708

Edge Detection
Module 710

Overlap
Detection Module
712

Grid Cell
Movement
Module 714

900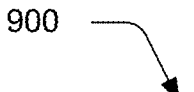

<u>902</u>
Receive a selection input as corresponding to a first grid cell of a plurality of grid cells forming a grid in a user interface <u>904</u>
Determine a first edge of the first grid cell that corresponds to the selection input <u>906</u>
Identify a second edge of a second grid cell of the plurality of grid cells <u>908</u>
Detect a third edge of a third grid cell of the plurality of grid cells as overlapping the second edge of the second grid cell along the direction <u>910</u>
Move the first, second, and third edges together as following a movement input receive via the user interface

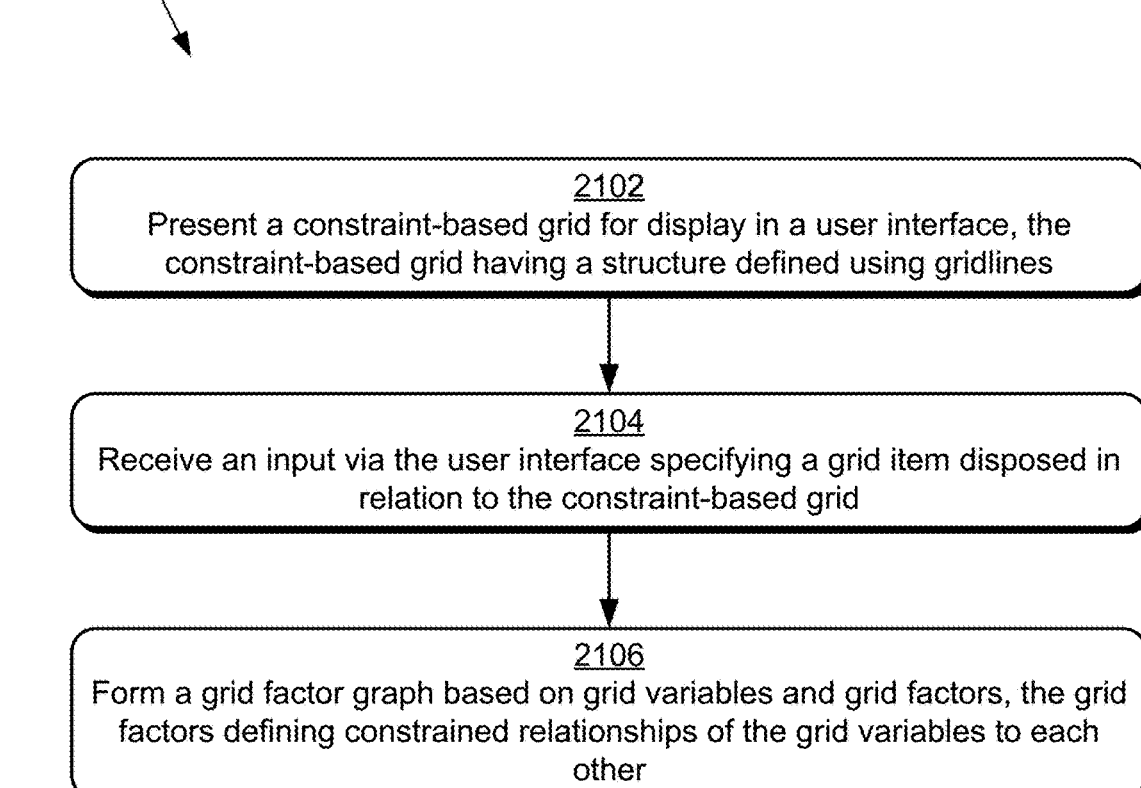

2102
Present a constraint-based grid for display in a user interface, the constraint-based grid having a structure defined using gridlines 2104
Receive an input via the user interface specifying a grid item disposed in relation to the constraint-based grid 2106
Form a grid factor graph based on grid variables and grid factors, the grid factors defining constrained relationships of the grid variables to each other 2108
Receive an edit to the constrained-based grid or the grid item via the user interface 2110
Update the grid factor graph based on the edit 2112
Present the constraint-based grid and the grid item for display in the user interface by resolving the updated grid factor graph

GRID STRUCTURE CONTROL IN DIGITAL CONTENT

RELATED APPLICATIONS

This Application claim priority under 35 U.S.C. § 119(e) to U.S. Provisional Patent Application No. 63/518,502, filed Aug. 9, 2023, and titled "Grid Structure Control in Digital Content," the entire disclosure of which is hereby incorporated by reference.

BACKGROUND

Grids are used as an underlying basis to define arrangement of digital content, one to another, in a wide variety of usage scenarios. A grid, for instance, may be utilized to define an arrangement of digital images and text within a webpage, a title and supporting information in a digital flyer, objects arrangements within slides of a digital presentation, and so forth.

Conventional techniques used to define a grid, however, typically rely on manual interaction of a user to accurately arrange and format a structure of the grid, such as to change sizes of individual grid cells, an overall size and arrangement of the grid as a whole, and so forth. Consequently, technical problems are encountered when confronted with complex structures of varied size, which results in inefficient use of computational resources and user frustration due to limitations of conventional techniques that rely on this manual interaction.

SUMMARY

Grid structure control techniques and systems are described that support use of a flexible grid structure and layout control. The flexible grid structure, for instance, supports dynamic updates to a structure of a grid. To do so, a grid structure control module supports different modes (e.g., "levels") of grid edits. In a divider edit mode, global control of a grid layout is supported by the grid structure control module. In a grid cell edit mode, changes are made to an individual grid cell that is selected as well as adjacent grid cells in the grid, e.g., based on overlaps of edges along directions that are orthogonal to a side of the individual grid cell.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIG. 4 depicts a system in an example implementation showing operation of a divider edit mode module in greater detail as implementing a divider edit mode as part of grid structure control.

FIG. 5 depicts a system in an example implementation showing operation of a divider edit mode module in greater detail as implementing a divider edit mode as part of grid structure control for a divider that defines a set of grid cells having edges that are disposed adjacent to the divider.

FIG. 6 depicts a system in an example implementation showing operation of a divider edit mode module in greater detail as implementing a divider edit mode as continuing an example of flexible grid structure control described in relation to FIG. 5.

FIG. 7 depicts a system in an example implementation showing operation of a grid cell edit mode module in greater detail as implementing a grid cell edit mode as part of grid structure control.

FIG. 8 depicts a system in an example implementation showing operation of a grid cell edit mode in greater detail as implementing a grid cell edit mode as editing a series of grid cells having overlapping edges.

FIG. 9 is a flow diagram depicting a step-by-step procedure in an example implementation of operations performable by a processing device for accomplishing a result of grid editing involving overlaps in a grid cell editing mode.

FIG. 21 is a flow diagram depicting a step-by-step procedure in an example implementation of operations performable by a processing device for accomplishing a result of grid factor graph generation, update, and resolution.

DETAILED DESCRIPTION

Overview

Figure 1:
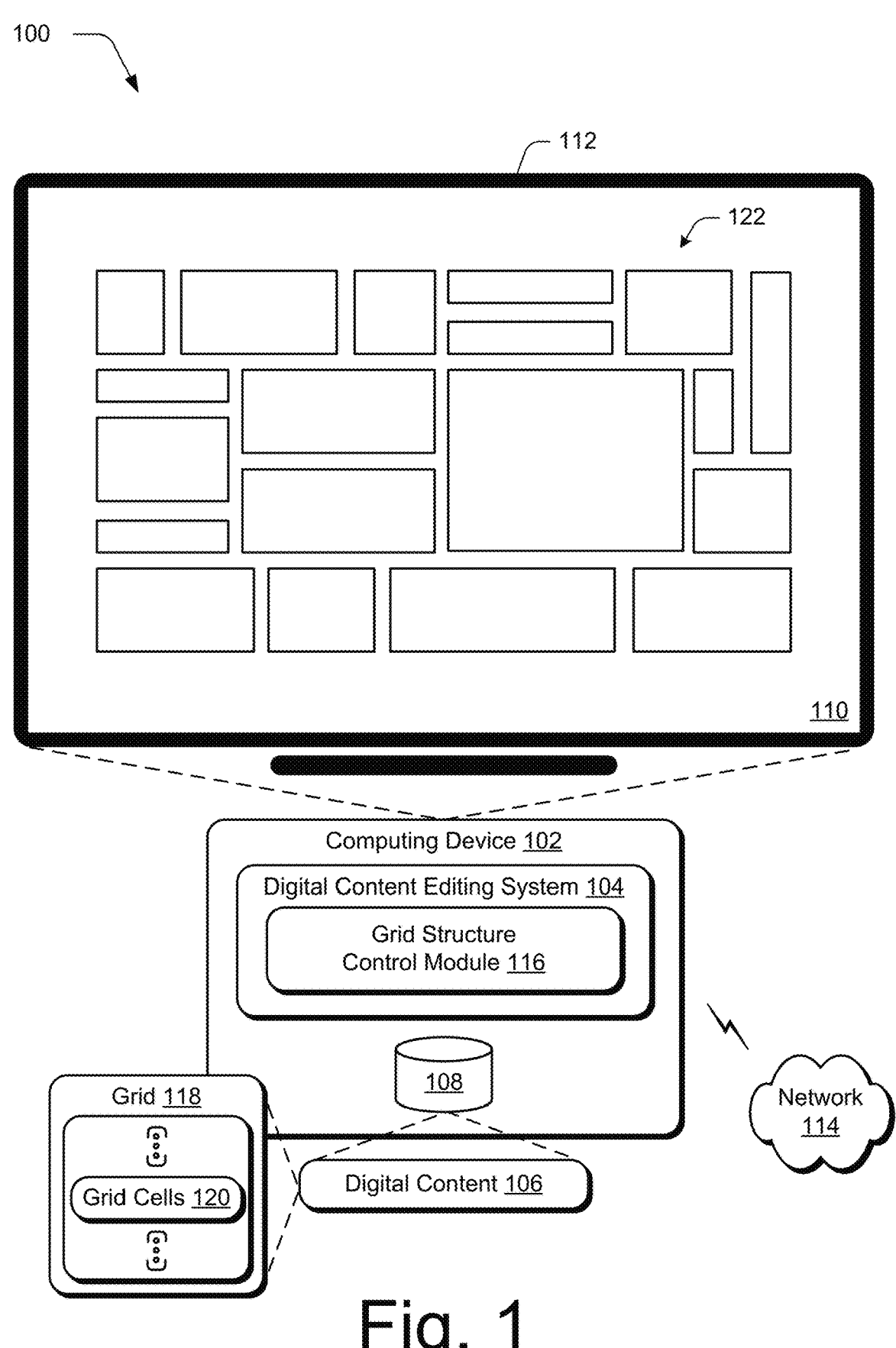
FIG. 1 is an illustration of a digital medium environment in an example implementation that is operable to employ grid structure control techniques as described herein.

Grids are utilized in support of a wide range of usage scenarios. However, conventional techniques used to define grids and structure of the grids are inflexible, support limited user interaction, and are difficult to understand and implement. These challenges result in inefficient computational resource consumption and user inefficiencies caused by attempts to manually overcome these deficiencies, which may cause visual artifacts due to a lack of manual accuracy.

Accordingly, grid structure control techniques and systems are described. The grid structure control techniques support use of a flexible grid structure and layout control. The flexible grid structure, for instance, supports dynamic updates to a structure of a grid by updating how grid cells are arranged in the grid. A grid cell, for instance, may "break" an existing relationship with one or more adjacent cells to support an expanded range of grid layouts that is not possible using conventional techniques.

In one or more examples, a grid structure control module is utilized to control a grid structure as part of a digital content editing system. The grid structure control module supports different modes (e.g., "levels") of grid edits by activating the different modes responsive to user input. In a divider edit mode, global control of a grid layout is supported by the grid structure control module. The divider edit mode, for instance, supports output of a grid indication in a user interface of selection of a grid as a whole and includes handles that are user selectable to globally resize an entirety of the grid and accordingly grid cells within the grid.

The divider edit mode also supports display of a divider indication that corresponds to an axis in the grid that does not intersect grid cells within the grid. The divider indication, for instance, is displayed in the user interface in response to a selection input detected between grid cells in the grid, e.g., as a gutter between the cells. Interaction with the divider indication is usable to edit a set of grid cells having edges disposed within a threshold distance from the divider indication. A movement input, for instance, is usable to select and move the divider indication, which causes corresponding movement of the edges of the set of grid cells as following movement of the movement input. Although the following discussion describes a selection input and a movement input to indicate corresponding functionality separately, these inputs are combinable as a single continuous input, e.g., a "click-and-drag."

The movement of the edges causes corresponding resizing of the set of grid cells, e.g., to make one part of the set larger and one part of the set smaller in real time based on the movement. In this way, the divider edit mode supports "greedy" changes to correspond grid cells, meaning that each of the grid cells that are proximal to the divider indication are updated as the divider indication is moved, which supports quick resizing of rows and columns of the grid in support of broad changes to an underlying grid structure. Further discussion of use of the divider edit mode is described in relation to FIGS. 4-6 in the following description.

In a grid cell edit mode, changes are made to an individual grid cell that is selected as well as adjacent grid cells in the grid, e.g., based on overlaps of edges along directions that are orthogonal to a side of the individual grid cell. To enter the grid cell edit mode, for instance, the grid structure control module detects a selection of a grid cell in the grid (e.g., tap gesture, "click" through use a cursor control device, and so on), which is referred to as a first grid cell in this example. In response, a grid cell indication is output in the user interface indicating selection of the first grid cell and entry into the grid cell edit mode. The grid cell indication, for instance, includes handles disposed along corresponding edges of the first grid cell that are usable to move corresponding edges to resize the cell and the adjacent cells.

A movement input, for instance, is received via the user interface as selecting a handle and subsequent movement of the handle, e.g., as a click-and-drag by a cursor control device. In response, the grid structure control module, as part of the grid cell edit mode, determines a first edge of the first grid cell that corresponds to an axis defined by a direction of movement of the movement input, e.g., an edge corresponding to a respective handle that is selected. The grid structure control module then identifies whether another edge of another grid cell is disposed proximal to and overlaps the first edge. The grid structure control module, for instance, determines that a second grid cell includes a second edge that is disposed proximal and orthogonal to (i.e., opposite of) the first edge of the first grid cell. Accordingly, movement of the first edge also causes movement of the second edge as following movement of the movement input, e.g., as a "click and drag" of the handle.

The grid cell edit mode also supports propagating the movement to additional grid cells having overlapping edges to those that are subject of the movement automatically and without further user intervention. Propagation of the movement acts to preserve a grid structure of the grid without introducing "dead space." To do so, the grid cell edit mode is configured to successively identify edges that overlap the first or second edges in the previous example along a direction of a surface of the edges. The first grid cell, for instance, includes a first edge that overlaps the second edge of the second grid cell as being orthogonal to at least a portion of the first edge.

Likewise, a third edge may then be detected as part of a third grid cell, the third edge overlaps the second edge of the second grid cell as being orthogonal to at least a portion of the second edge, or first edge. This process continues until overlaps are no longer detected (e.g., a divider is detected defining an axis in the grid that does not intersect grid cells in the grid), thereby forming a set of grid cells and corresponding edges that are moved together as following movement specified by the movement input.

For example, the movement input of the handle of the first edge is used to automatically move the second and third edges of the second and third grid cells in this example together as following the movement. In this way, movement of multiple grid cells is performed automatically and without user intervention in response to movement specified for use with a single cell, thereby improving visual consistency and accuracy with reduced consumption of computational resources. Further discussion of a grid cell edit mode is further described in relation to FIGS. 7-9.

Grid structure control techniques are also described in relation to FIGS. 10-21 to implement the grid as a constraint-based grid. The constraint-based grid is configured using constrained relationships between grid lines used to define a structure of the grid. The constrained relationships, for instance, are usable to define locations of grid lines used to define the structure of the grid in relation to each other based on the grid factor graph. For example, a grid line "X_1" may be defined in the grid factor graph as having a constrained relationship as being disposed halfway between grid line "X_0" and "X_2." Therefore, movement of grid line "X_2" causes corresponding movement of grid line "X_1," automatically and without user intervention.

Likewise, the constrained relationships are also usable to define a location of the grid item with respect to the grid. To do so, locations used to define a grid item in the grid factor graph is defined based on constrained relationships. A location of a top left corner of a grid item, for instance, is definable in the grid factor graph as having an "X" coordinate of a constrained relationship as halfway between grid line "X_0" and grid line "X_1." Thus, continuing with the previous example movement of grid line "X_2" causes corresponding movement of grid line "X_1," which is the populated down to subsequent locations of a corresponding grid item. In this way, the grid factor graph is configurable to respond dynamically to edits.

Accordingly, grid structure control techniques and systems are described. The grid structure control techniques support use of a flexible grid structure and layout control. The flexible grid structure, for instance, supports dynamic updates to a structure of a grid by updating how grid cells are arranged in the grid. A grid cell, for instance, may "break" an existing relationship with one or more adjacent cells to support an expanded range of grid layouts that is not possible using conventional techniques. Additionally, a grid factor graph is described that is usable to implement an independent layout environment in which layout of grid items within the container are not affected by rules and formatted outside of the container. Further discussion of these and other technical advantages are included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Grid Structure Control Environment

FIG. 1 is an illustration of a digital medium environment 100 in an example implementation that is operable to employ grid structure control techniques as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a digital content editing system 104. The digital content editing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Digital content 106 is configurable in a variety of ways, examples of which include digital images, digital documents, digital presentation, webpages, digital movies, and so forth which may also be used as a basis to render physical versions of the digital content, e.g., to print a digital document. Although illustrated as implemented locally at the computing device 102, functionality of the digital content editing system 104 is also configurable as whole or part via functionality available via the network 114, such as part of a web service or "in the cloud."

An example of functionality incorporated by the digital content editing system 104 to process the digital content 106 is illustrated as a grid structure control module 116. The grid structure control module 116 is configured to control an underlying structure of a grid 118 having a plurality of grid cells 120. The grid 118, for instance, is definable as a structure using a first and second axis that have a defined relationship, e.g., an X and Y axis that are orthogonal to each other. The grid cells 120 are then defined with respect the structure, e.g., defined along axis, may include dividers (e.g., "gutters") defining a spacing between the grid cells 120, and so forth.

As previously described, conventional techniques are challenged when tasked with implementing complex grid structures due to reliance on manual interaction to individually interact with portions of the grid structure, and consequently is prone to error in real-world scenarios. Accordingly, the grid structure control module 116 is configured to implement a flexible grid structure and layout control that supports efficient user interaction in defining complex grid structures in an intuitive manner with increased accuracy.

The grid structure control module 116, for instance, is configurable to reassign relationships of the grid cells 120 in real time as inputs are received via the user interface 110. The grid structure control module 116 is also configured to determine a nature of current and future relationships of those grid cells 120 will have and whether those relationships are valid or whether to adjust those relationships. In the illustrated example grid structure 122 illustrated in the user interface 110 of FIG. 1, interactions with the grid 118 and grid cells 120 are controllable to maintain visual consistency, automatically and without further user intervention.

Figure 2:
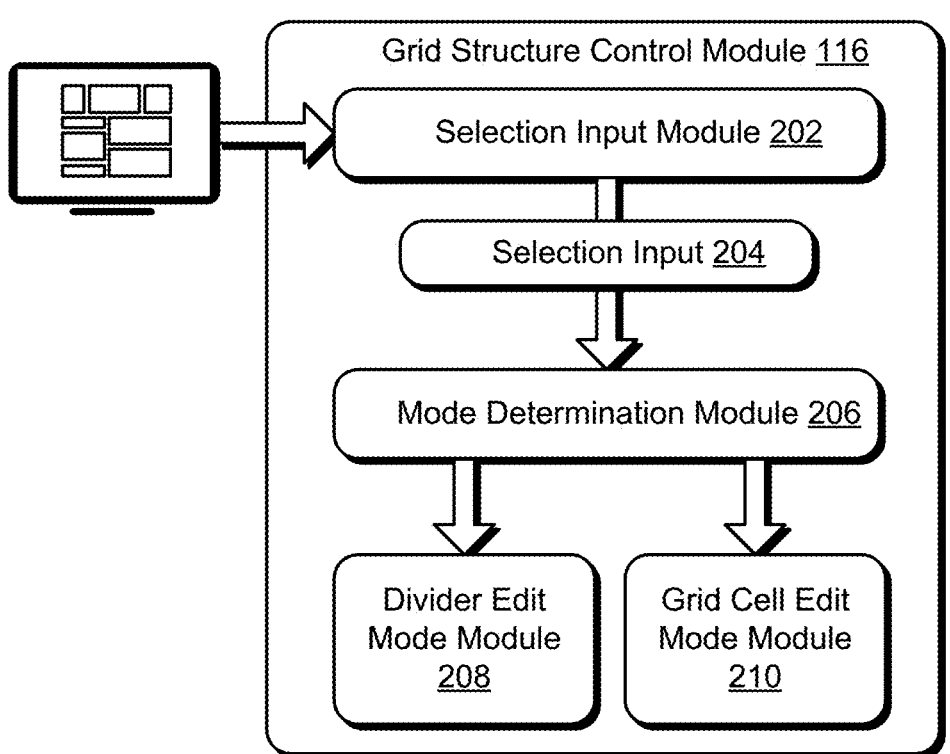
FIG. 2 depicts a system in an example implementation showing operation of the grid structure control module of FIG. 1 in greater detail.

FIG. 2 depicts a system 200 in an example implementation showing operation of the grid structure control module 116 of FIG. 1 in greater detail. The grid structure control module 116 includes a selection input module 202 that is configured to receive a selection input 204 via a user interface 110. The user interface 110, for instance, displays a grid 118 having a plurality of grid cells 120 and the selection input 204 is detected via interaction with the grid 118 and/or grid cells 120.

A mode determination module 206 is then utilized to select a mode based on characteristics of the selection input 204. Examples of functionality to implement the modes include a divider edit mode module 208 configurable to implement a divider edit mode and a grid cell edit mode module 210 configurable to implement a grid cell edit mode.

The divider edit module 208, for instance, is configurable to implement global edits to a flexible grid structure of the grid 118. The grid cell edit mode module 210, on the other hand, is configurable to implement local edits to grid cells 120 of the grid 118 as well as other grid cells that are affected by the local edits.

Figure 3:
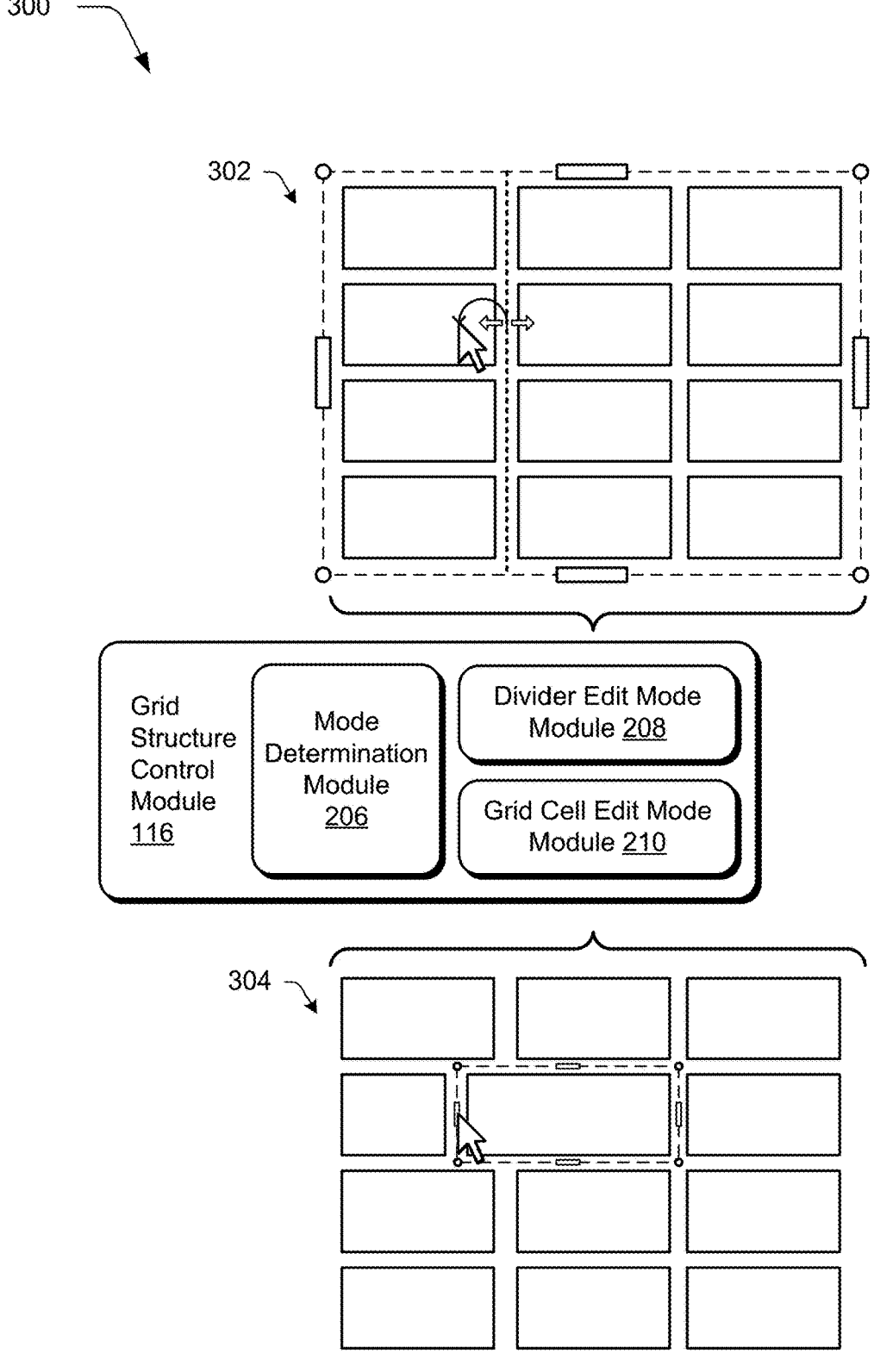
FIG. 3 depicts a system in an example implementation showing operation of a divider edit mode module and a grid cell edit mode module of a grid structure control module of FIG. 2 in greater detail.

FIG. 3 depicts a system in an example implementation 300 showing operation of the divider edit mode module 208 and the grid cell edit mode module 210 of the grid structure control module 116 of FIG. 2 in greater detail. In this example implementation, a first grid 302 and a second grid 304 are illustrated. The mode determination module 206 is then tasked with selecting which mode to implement based on a selection input.

In both illustrated instances, the first and second grids 302, 304 are displayed in a user interface that includes a plurality of grid cells depicted as rectangles. The mode determination module 206 then determines whether a selection input received via the user interface 110 indicates a global edit to the grid or a local edit to individual cells.

For the first grid 302, a selection input is received indicative that a global edit is detected by the mode determination module 206. The selection input, for example, involves a selection within a divider between grid cells in the first grid 302, e.g., a "click" in a space between the grid cells. Based on the selection input, the mode determination module 206 determines a global edit is desired and in response enters a divider edit mode as implemented by a divider edit mode module 208. In the divider edit mode, edges of grid cells that are disposed within a threshold distance from a divider are moved together as following a movement input specifying movement of the divider. Further discussion of implementation of the divider edit mode is described in relation to FIGS. 4-6.

On the other hand, a selection input is received at the second grid 304 that involves selection of an individual grid cell, e.g., as a "click" within a boundary of the grid cell. Based on the selection input, the mode determination module 206 determines a local edit is desired and in response enters a grid cell edit mode as implemented by a grid cell edit mode module 210. In the grid cell edit mode, edges of grid cells are moved together that have overlapping surfaces within the grid. Further discussion of implementation of the grid cell edit mode is described in relation to FIGS. 7-9.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Divider Edit Mode as Part of Grid Structure Control

FIG. 4 depicts a system 400 in an example implementation showing operation of a divider edit mode module 208 in greater detail as implementing a divider edit mode as part of grid structure control. This example is illustrated using a plurality of stages that include a first state 402, a second stage 404, and a third stage 406. Operation of the divider edit mode module 208 is shown in greater detail as including a divider indication module 408, an edge detection module 410, and a grid cell movement module 412. FIG. 4 is an example of a divider edit mode that supports a global level of edits to a grid layout.

At the first stage 402, a grid is displayed in a user interface 110 as having a plurality of grid cells configured as equal sized rectangles. A selection input 204 is received that indicates a global edit to the grid. For example, the selection input 204 is detected as selecting a divider 414 as a space disposed between adjacent grid cells in the user interface 110.

In response, as shown at the second stage 404, a divider indication module 408 outputs a grid indication 416. The grid indication 416 indicates selection of the grid as a whole. The grid indication 416, for instance, includes handles disposed at respective sides of the grid indication 416 that are usable to resize the plurality of cells together, e.g., to expand or reduce the grid cells in a corresponding direction.

The divider indication module 408 also outputs a divider indication 418 based on a location of the divider 414 in the user interface 110. The divider indication 418 is a user interface element that is user selectable to specify movement of a corresponding axis defined in the grid for grid cells having sides that are disposed within a threshold distance and are not intersected by the divider. In the illustrated example of the second stage 404, the axis extends entirely through the grid as not intersecting any of the grid cells in the grid.

Accordingly, an edge detection module 410 is utilized to detect which grid cells have edges that are disposed within a threshold distance from the divider. The detection of the grid cells is used to define a subset of the grid cells in the grid that is to be used as a basis to perform an edit operation, e.g., to resize the cells. In the illustrated example, grid cells 420, 422, 424, 426, 428, 430, 430, 434 have edges that are disposed within the threshold distance of the divider, and thus the divider indication 418.

In response, a grid cell movement module 412 is employed by the divider edit mode module 208. The grid cell movement module 412 is configured to detect a movement input to move the respective edges of the grid cells, e.g., as a "click-and-drag" operation as input by a cursor control device. The movement input, for instance, is illustrated as a movement by a defined amount to the left in the user interface as shown at the second stage 404 using an arched arrow.

The grid cell movement module 412 is configured to move corresponding edges of the grid cells 420-434 as following movement of the movement input in real time to resize the grid cells 420-434. A result of which is illustrated at the third stage 406 in which grid cells 420, 424, 428, 432 are made smaller along a horizontal axis and grid cells 422, 426, 430, 434 are made larger along the horizontal axis. Thus, in this example the divider edit mode is configured to edit grid cells based on a divider that passes through an entirety of the grid without intersecting grid cells of the grid. Partial divider techniques are also contemplated, an example of which is described as follows and is shown in a corresponding figure.

FIG. 5 depicts a system 500 in an example implementation showing operation of a divider edit mode module 208 in greater detail as implementing a divider edit mode as part of grid structure control for a divider that defines a subset of grid cells having edges that are disposed adjacent to the divider. This example is illustrated using a plurality of stages that include a first stage 502, a second stage 504, and a third stage 506. Operation of the divider edit mode module 208 is also shown in greater detail as described in FIG. 4 as including a divider indication module 408, an edge detection module 410, and a grid cell movement module 412.

In this example as shown at the first stage 502, a selection input is received that defines a divider 508 disposed between adjacent grid cells in the user interface. The selection input, for instance, defines a location between edges of adjacent grid cells and the divider 508 as orthogonal to those edges.

At the second stage 504, the divider indication module 408 outputs a grid indication 510. The grid indication 510, as previously described, indicates selection of the grid as a whole. The grid indication 510 also includes handles (depicted using rectangles and circles disposed on dashed lines defining a border) disposed at respective sides of the grid indication 510 that are usable to resize the plurality of cells together.

The divider indication module 408 also outputs a divider indication 512 based on a location of the divider 508 in the user interface 110. The divider indication 512 is a user interface element that is user selectable to specify movement of a corresponding axis defined in the grid by the divider 508. The divider 508, and corresponding divider indication 512, are used to define a set of grid cells that are not intersected by the divider indication 512 and that have edges that are disposed within a threshold distance of the divider indication 512. In the illustrated example, the subset is defined by the edge detection module 410 as including grid cells 514, 516, 518, 520, but does not include grid cells 522, 524, 526, 528.

Accordingly, a gird cell movement module 412 is configured to control movement of edges of the grid cells 514, 516, 518, 520 in the set to resize those cells as following movement of a movement input as shown at the second stage 504, a result of which is illustrated at the third stage 506. Thus, in this example grid cells 514, 516, 518, 520 having edges disposed adjacent to the divider and that do not intersect the divider are resized, but grid cells 524, 528 that intersect the divider are not resized.

Figure 6:
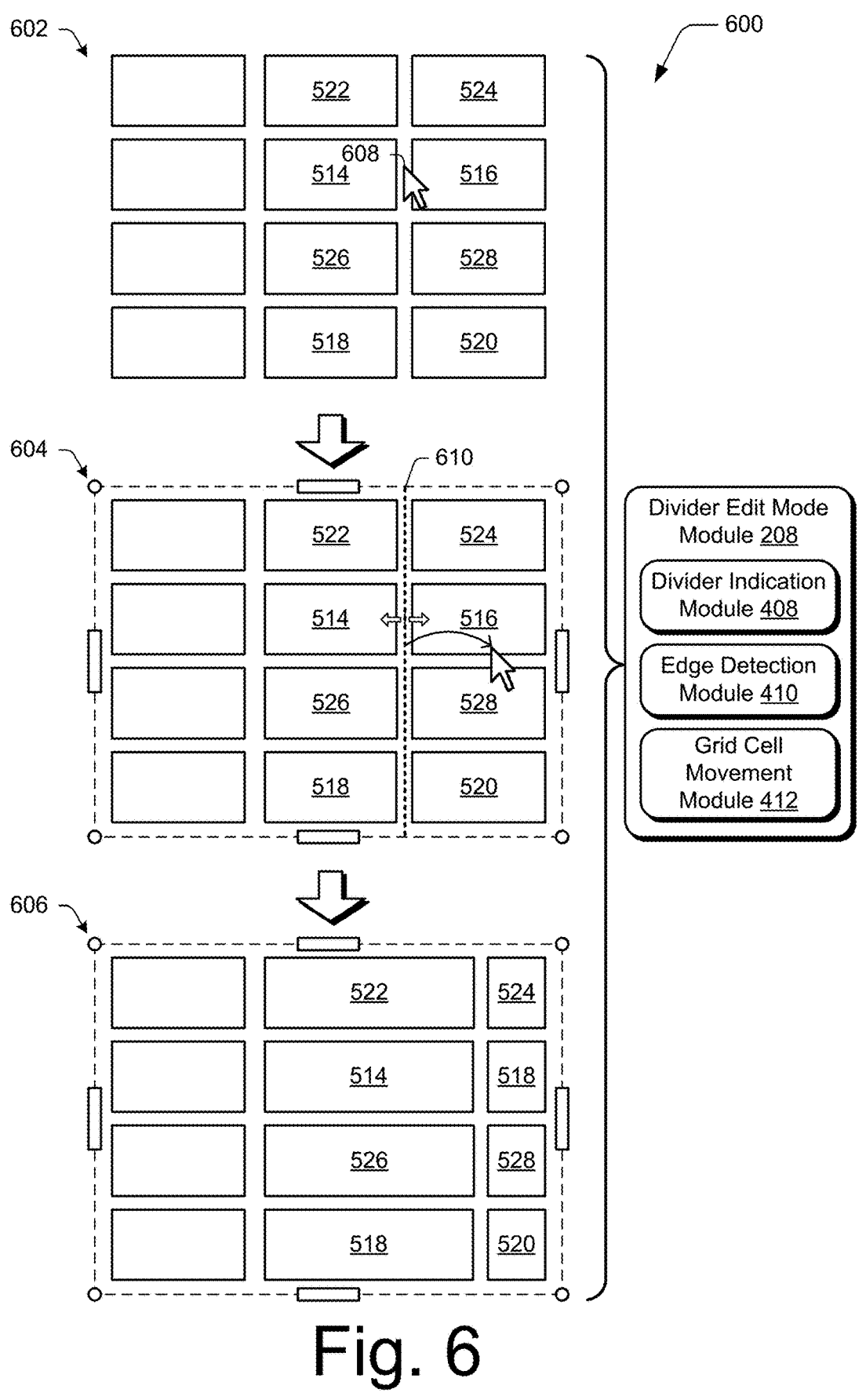

FIG. 6 depicts a system 600 in an example implementation showing operation of a divider edit mode module 208 in greater detail as implementing a divider edit mode as continuing an example of flexible grid structure control described in relation to FIG. 5. FIG. 6 is illustrated using first, second, and third stages 602, 604, 606. As previously described, the divider edit mode module 208 supports flexible grid structure control that is dynamically updated in real time as changes are made to the grid to define relationships of grid cells to each other.

Accordingly, at the first stage 602 the grid cells 514-528 are arranged based on the divider edit made in FIG. 5. A selection input is received defining a divider 608 at the first stage 602 as orthogonal to edges of corresponding grid cells 514 and 516 similar to the first stage 502 of FIG. 5. In response, a divider indication module 408 generates a divider indication 610.

An edge detection module 410 is then utilized to detect edges of grid cells that are disposed within a threshold distance of the divider 508 (and divider indication 510) and corresponding grid cells are not intersected by the divider. As before grid cells 514, 516, 518, 520 meet this criteria and are included in a set for modification by a movement input. However, grid cells 522, 524, 526, 528 also meet this criteria and are also included in the set for modification. Accordingly, grid cells 514-528 have edges that are moved together in this example as following movement of a movement input, a result of which is shown at the third stage 606. Grid level edits are also supported, further discussion of which is included in the following section and shown in corresponding figures.

Grid Cell Edit Mode as Part of Grid Structure Control

The following discussion describes grid cell edit mode techniques that are implementable utilizing the described systems and devices. Aspects the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm. Parts of the following discussion are made in parallel with FIG. 9, which is a flow diagram depicting a step-by-step procedure 900 in an example implementation of operations performable by a processing device for accomplishing a result of grid editing involving overlaps in a grid cell editing mode.

Figure 7:
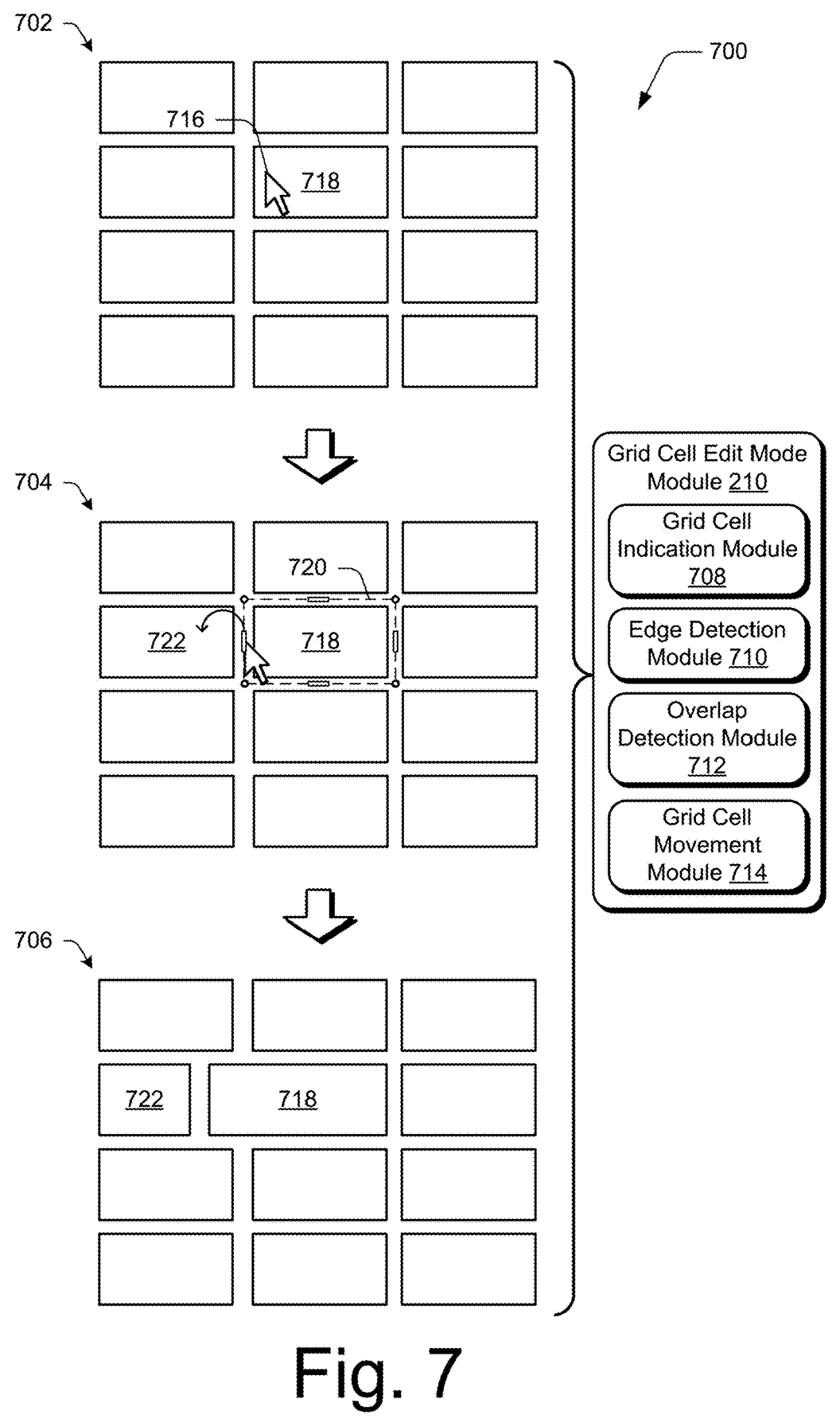

FIG. 7 depicts a system 700 in an example implementation showing operation of a grid cell edit mode module 210 in greater detail as implementing a grid cell edit mode as part of grid structure control. This example is illustrated using a plurality of stages that include a first state 702, a second stage 704, and a third stage 706. Operation of the grid cell edit mode module 210 is shown in greater detail as including a grid cell indication module 708, an edge detection module 710, an overlap detection module 712, and a grid cell movement module 714. FIG. 7 is an example of a grid cell edit mode that supports a local level of edits to grid cells within a grid layout.

At the first stage 702, a selection input 716 is received. The selection input module 202 of FIG. 2 then enters a grid cell edit mode based on a determination that at least one grid cell is selected, e.g., the input is a "click" or "tap" within a border of a grid cell, a "lasso" or bounding box selecting multiple grid cells, and so forth.

In response as shown at the second stage 704, a grid cell indication module 708 outputs a grid cell indication 720 indicative of which grid cells are subject of the grid cell edit. The grid cell indication 720 in the illustrated example includes a border disposed around the grid cell and includes handles that support manipulation to move respective sides of the grid cell to resize the cell as part of a movement input.

In the illustrated example, a movement input is specified with respect to a left edge of the grid cell 718 using a handle of the grid cell indication 720. In response, the edge detection module 710 detects an edge of the grid cell 718 corresponding to the movement input. An overlap detection module 712 is then employed to detect an overlap of the detected edge with other edges of other grid cells within the grid. In this example, a right edge of a cell 722 is identified as overlapping the edge of grid cell 718 by identifying at least a portion of the edge is opposite from (e.g., is orthogonal to) an edge of grid cell 722 being disposed orthogonally to each other.

In response, a grid cell movement module 714 generates a subset of grid cells and respective edges that are to be moved as following movement of the movement input in real time. A result of the movement input is shown at the third stage in which grid cell 718 is expanded to the left and grid cell 722 is reduced from a right side. In this way, a minimal amount of grid cells are resized automatically and without further user intervention to maintain visual consistency for a single overlap. These techniques also support scenarios involving a series of overlaps between a sequence of edges from corresponding grid cells, an example of which is described as follows and shown in corresponding figures.

FIG. 8 depicts a system 800 in an example implementation showing operation of a grid cell edit mode module 210 in greater detail as implementing a grid cell edit mode as editing a series of grid cells having overlapping edges. This example is illustrated using a plurality of stages that include a first state 802, a second stage 804, and a third stage 806. Operation of the grid cell edit mode module 210 is implemented using a grid cell indication module 708, an edge detection module 710, an overlap detection module 712, and a grid cell movement module 714 as previously described.

At the first stage 802 a selection input is received as selecting a first grid cell 808 of a plurality of grid cells forming a grid in a user interface (block 902). In response, the grid cell indication module 708 outputs a grid cell indication 810 usable to resize the first grid cell 808. An edge detection module 710 is employed to detect a first edge of the first grid cell 808 corresponds to a subsequent movement input (block 904), e.g., based on selection of a handle or other portion of the grid cell indication 810 and/or the first grid cell 808.

The overlap detection module 712 is then employed to detect overlaps of other edges and corresponding grid cells in the grid that are also to be resized, e.g., to maintain visual consistency. The overlap detection module 712, for instance, identifies a second edge of a second grid cell 812 of the plurality of grid cells. The second edge disposed along a direction (e.g., of movement) in the user interface that is orthogonal to the first edge of the first grid cell (block 906). Thus, an overlap of a portion of the first edge of the first grid cell 808 overlaps a portion of the second edge of the second grid cell 812. In other words, movement of the first edge as part of the movement input would intersect the second edge of the second grid cell 812. Accordingly, the second edge of the second grid cell 812 is included in a set to be moved together in response to a movement input.

Overlap detection continues for additional edges in a sequence of overlaps. In the illustrated example, the overlap detection module 712 detects a third edge of a third grid cell 814 of the plurality of grid cells as overlapping the second edge of the second grid cell 812 (block 908). Thus, in this example the overlap is identified between second and third edges of the second and third grid cells 812, 814. This process continues until an overlap is no longer detected, e.g., a divider 816 is reached in which intersections of grid cells no longer occur. The grid cell movement module 714 is then employed to move the first, second, and third edges together as following a movement input received via the user interface (block 910).

Accordingly, grid structure control techniques and systems are described that support use of a flexible grid structure and layout control. The flexible grid structure, for instance, supports dynamic updates to a structure of a grid by updating how grid cells are arranged in the grid.

Grid Factor Graph Generation and Resolution

Figure 10:
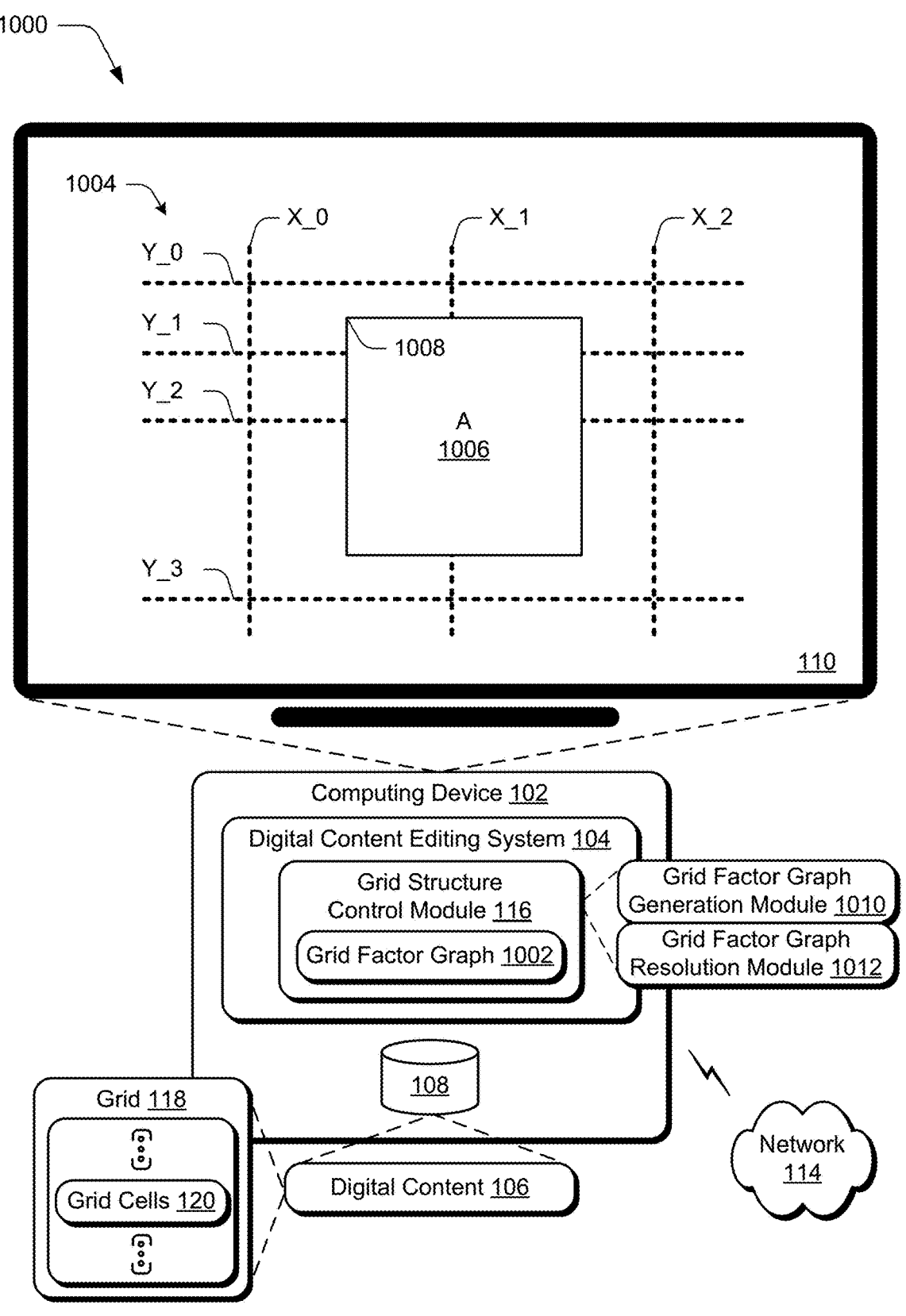
FIG. 10 depicts a system in an example implementation showing operation of the grid structure control module in greater detail as implementing a grid factor graph as part of grid structure control.

FIG. 10 depicts a system 1000 in an example implementation showing operation of the grid structure control module 116 in greater detail as implementing a grid factor graph as part of grid structure control. In this section, the grid factor graph 1002 is utilized by the grid structure control module 116 to implement the grid 118 as a constraint-based grid. The constraint-based grid is configured using constrained relationships between grid lines used to define a structure of the grid. The constrained relationships, for instance, are usable to define locations of grid lines 1004 that define the structure of the grid in relation to each other based on the grid factor graph 1002. In the illustrated example, for instance, grid line "X_1" is defined in the grid factor graph 1002 as having a constrained relationship as being disposed halfway between grid line "X_0" and "X_2." Therefore, movement of grid line "X_2" causes corresponding movement of grid line "X_1," automatically and without user intervention.

Likewise, the constrained relationships of locations used to define a grid item 1006 (e.g., illustrated as a rectangle) in the grid factor graph 1002 are also usable to define a location of the grid item 1006 with respect to the grid 118. A location 1008 of a top left corner of the grid item 1006, for instance, is definable in the grid factor graph 1002 as having an "X" coordinate of a constrained relationship as halfway between grid line "X_0" and grid line "X_1." Thus, continuing with the previous example movement of grid line "X_2" causes corresponding movement of grid line "X_1," which is the populated down to location 1008 and corresponding grid item 1006.

Accordingly, a grid factor graph generation module 1010 is employed by the grid structure control module 116 to generate the grid factor graph 1002 and update the graph, e.g., in response to edits received via a user interface. A grid factor graph resolution module 1012 is used to resolve the grid factor graph 1002 (e.g., linear equations used to define the relationships) in order to determine locations of respective grid lines and grid items in order to render the grid 118. In this way, the grid factor graph 1002 as implemented by the grid structure control module 116 supports responsive layout features and polygon cell shapes as further described below.

In the following discussion, a grid 118 has an underlying structure formed by a set of grid lines, e.g., a first set of grid lines arranged along a first axis and a second set of grid lines arranged along a second axis that is perpendicular to the first axis. The first and second axis form a coordinate system into which grid items (e.g., grid cells, digital objects) are placed. A grid item references the grid lines using a constrained relationship to define its geometry, e.g., as a polygon.

A grid container is used by the grid structure control module 116 to establish an independent grid formatting context for grid items included within the container. The grid container, for instance, is usable to implement an independent layout environment in which layout of grid items within the container are not affected by rules and formatted outside of the container. For example, floating grid items do not intrude into the grid container, and the grid container's margins do not collapse with margins of grid items within the container. Grid items, for instance, are located as defined using a respective grid factor graph and a geometry of each grid item is calculated dynamically.

The grid factor graph 1002 is a graph that contains a set of grid variables and a set of grid factors. The grid variables are usable to define both the grid lines and location of grid items with respect to the grid lines. The grid factors define the constrained relationships between the grid variables, e.g., the grid lines and/or the grid items. In other words, the grid factors define how the grid variables are related to each other.

A grid factor is definable within the grid factor graph 1002 in a variety of ways. In an example, the grid factor is defined as a constraint as "<scope, rel>" where the scope is a tuple that identifies grid variables that participate in the constraint and "rel" is a relation that defines permitted values of those variables. A relation, for instance, is representable as an explicit set of each of the tuples of values that satisfy the constraint.

Figure 11:
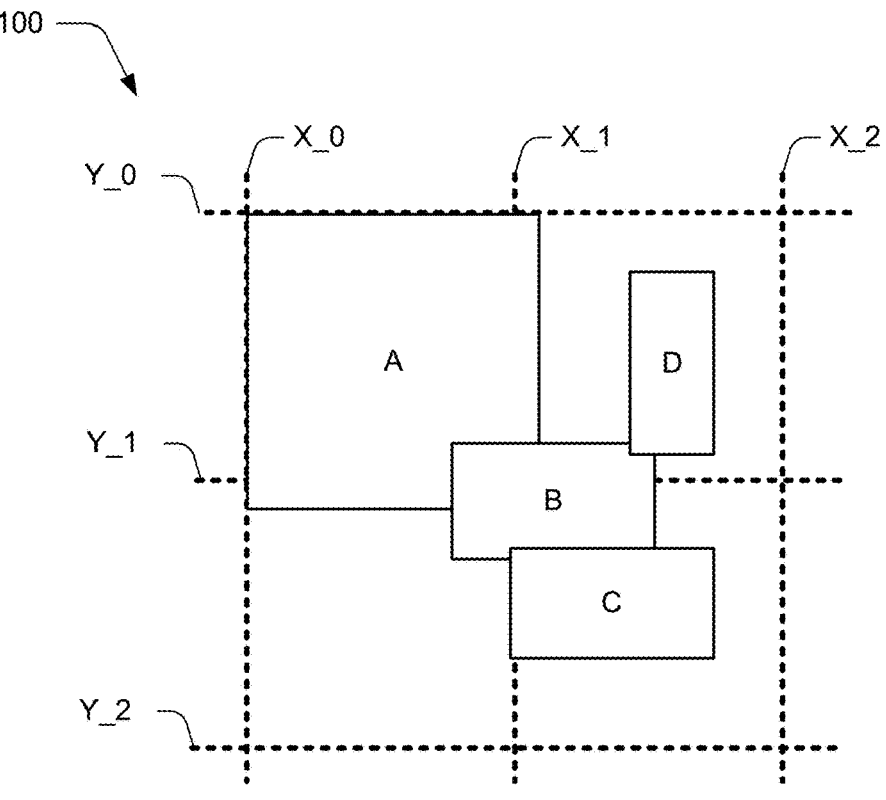
FIG. 11 depicts an example implementation of a grid having grid lines and a plurality of grid items.

FIG. 11 depicts an example implementation 1100 of a grid having grid lines and a plurality of grid items. In this example, the grid 118 is a 2×2 grid defined by a set of three grid lines across a X axis (e.g., "X_0," "X_1," "X_2") and a set of three grid lines across a Y axis, e.g., "Y_0," "Y_1," "Y_2." A grid container is formed in this example, which includes four grid items illustrated as rectangles "A," "B," "C," and "D."

The rectangles are representable in a variety of ways, such as through use of four variables defining locations as "x" and "y" as well as "width," and "height." In another example, the rectangles are represented as "x_min," "y_min," "x_max," and "y_max." A variety of other examples are also contemplated.

Figure 12:
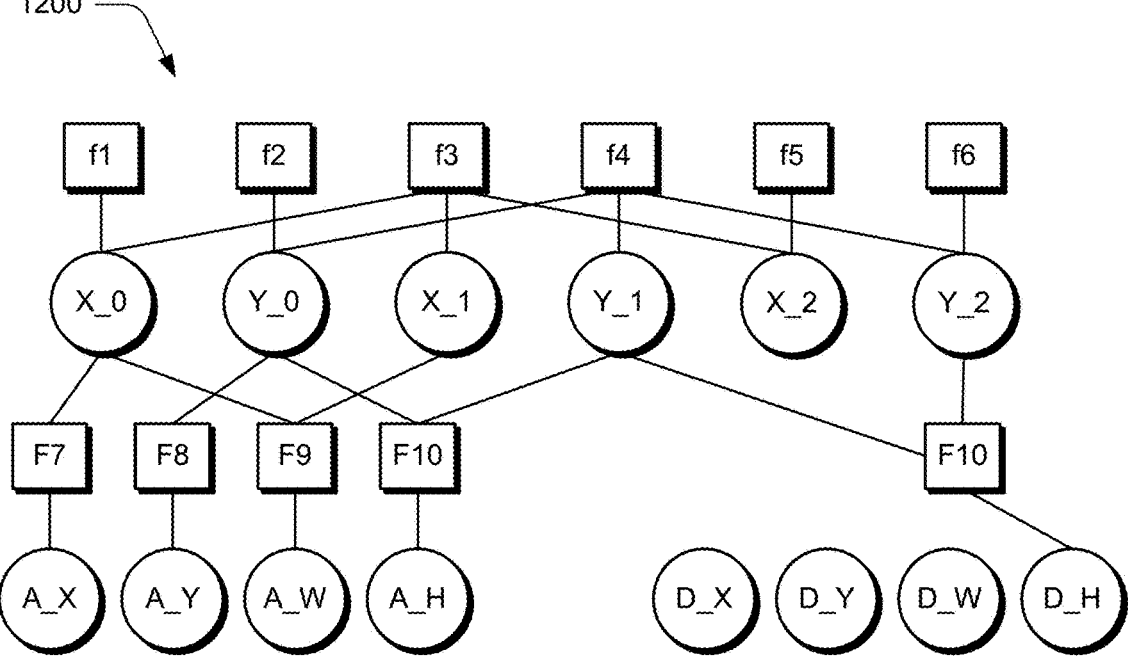
FIG. 12 depicts an example implementation of a grid factor graph generated by a grid factor graph generation module of FIG. 10 based on the grid of FIG. 11.

FIG. 12 depicts an example implementation 1200 of a grid factor graph 1002 generated by a grid factor graph generation module 1010 of FIG. 10 based on the grid 118 of FIG. 11. In the illustrated example, the grid factor graph 1002 depicts a set of graph variables using circles and grid factors using square boxes. In the set of graph variables, "X_0" is a top horizontal grid line and "Y_0" is a left vertical grid line. The graph variables "A_X," "A_Y," "A_W," and "A_H" define X and Y locations as well as width and height for grid element "A."

The grid factors are based in this example on a grid size of 1024. The grid factors are usable to define constrained relationships between the grid variables. For the illustrated example, the grid factors are usable to define a variety of scenarios, such as:

f1 is a constraint (X_0==0.0);
f2 is a constraint (Y_0==0.0);
f3 is a constraint (X_1==(X_2–X_0)/2);
f4 is a constraint (Y_1==(Y_2–Y_0)/2);
f5 is a constraint (X_2==1024.0);
f6 is a constraint (Y_2==1024.0);
f7 is a constraint (A_X==X_0);
f8 is a constraint (A_Y==Y_0);
f9 is a constraint (A_W==X_1–X_0);
f10 is a constraint (A_H==Y_1–Y_0);
. . . , and
f22 is a constraint (D_H==Y_2–Y_1).
In this example, the grid factors "f1" and "f2" define a top left of the grid 118 as "(0,0)" and "f5" and "f6" define the width and height of the grid. Grid factor "f3" defines a middle vertical grid line and "f4" defines a middle horizontal line. Accordingly, regardless of how the grid 118 is resized, the grid factors "f3" and "f4" ensure that the grid lines "X_1" and "Y_1" split the grid in the middle.

The grid factors "f7" and "f8" pin a top-left corner of the grid item "A" (e.g., the rectangle) on coordinates "(X_0, Y_0)" and the grid factor "f9" pins a right to grid line "X_1" and grid factor "f10" pins a bottom of grid element "A" to grid line "Y_1."

Figures 13, 14:
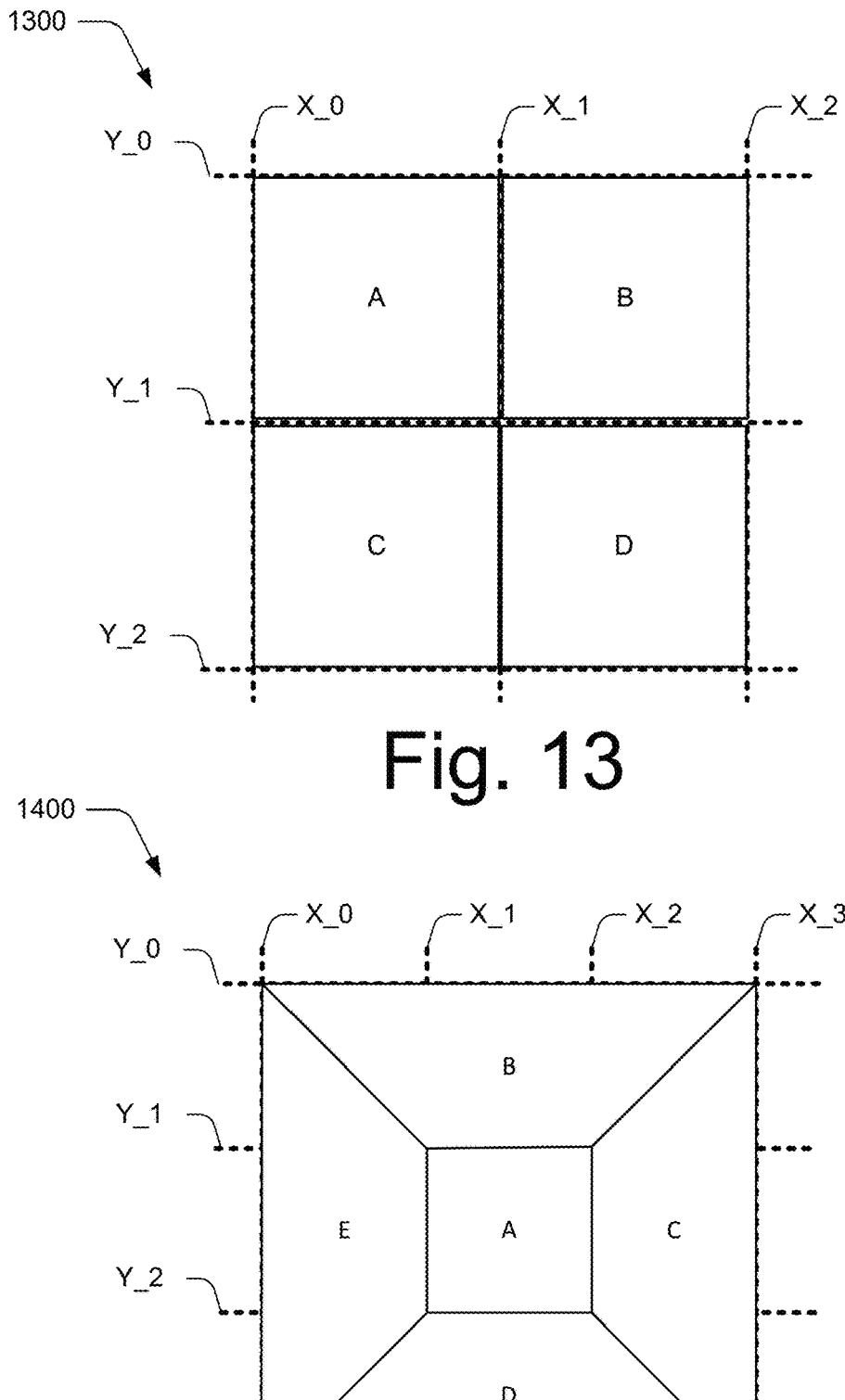
FIG. 13 depicts an example implementation of a grid having grid lines and a plurality of grid items as polygons forming squares.
FIG. 14 depicts an example implementation of a grid having grid lines and a plurality of grid items as polygons forming a square and trapezoids.

FIG. 13 depicts an example implementation 1300 of a grid having grid lines and a plurality of grid items as polygons forming squares. In this example, the grid 118 is also configured as a 2×2 grid defined by a set of three grid lines across a X axis (e.g., "X_0," "X_1," "X_2") and a set of three grid lines across a Y axis, e.g., "Y_0," "Y_1," "Y_2." A grid container is formed in this example, which includes four grid items illustrated as rectangles "A," "B," "C," and "D." Each of the grid elements "A," "B," "C," and "D" are defined using respective grid lines.

FIG. 14 depicts an example implementation 1400 of a grid having grid lines and a plurality of grid items as polygons forming a square and trapezoids. In this example, the grid 118 is also configured as a 3×3 grid defined by a set of four grid lines across a X axis (e.g., "X_0," "X_1," "X_2," "X_3") and a set of four grid lines across a Y axis, e.g., "Y_0," "Y_1," "Y_2," "Y_3." A grid container is formed in this example, which includes five grid items illustrated "A," "B," "C," "D," and "E."

Polygons having simple, arbitrary, and/or complex geometries may be represented by a set of vertexes. In this example, trapezoids are represented using four vertexes, and the grid factor graph includes "8+4+4*8*4=140" graph variables and one-hundred and forty graph factors.

Figure 15:
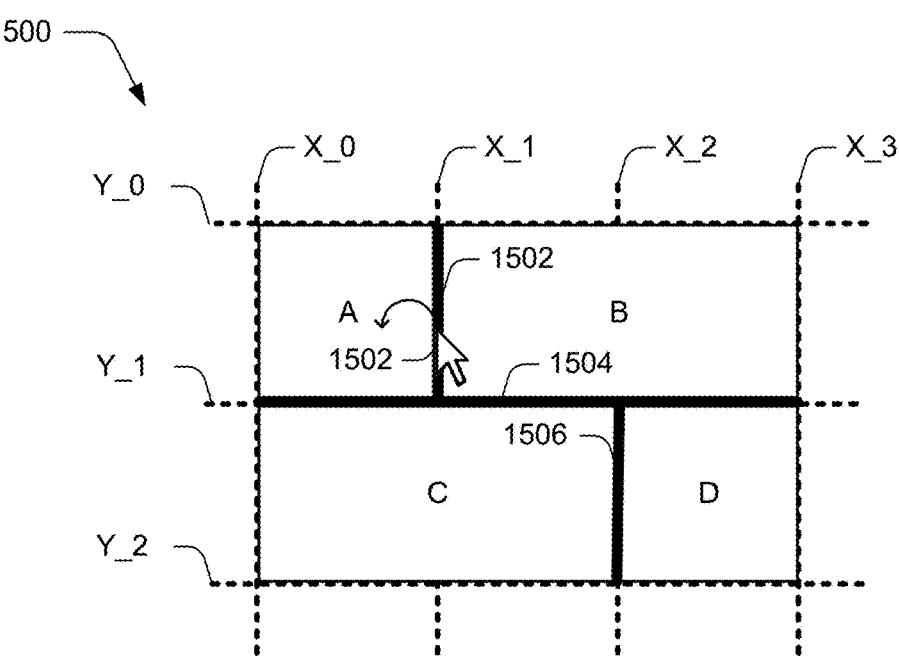
FIG. 15 depicts an example implementation of a grid having grid lines and a plurality of grid items having indications that are user selectable to resize corresponding grid lines and/or grid items.

FIG. 15 depicts an example implementation 1500 of a grid having grid lines and a plurality of grid items having indications that are user selectable to resize corresponding grid lines and/or grid items. In this example, the grid 118 is a 3×2 grid defined by a set of three grid lines across a X axis (e.g., "X_0," "X_1," "X_2") and a set of two grid lines across a Y axis, e.g., "Y_0," "Y_1." A grid container is formed in this example, which includes four grid items illustrated as rectangles "A," "B," "C," and "D."

The grid includes first, second, and third indications 1502, 1504, 1506 that are user selectable to resize grid elements within the grid, e.g., as part of a grid edit mode or divider edit mode as previously described. A first indication 1502, for instance, is user selectable through use of a selection input and subsequent movement input to resize grid elements "A" and "B" in a horizontal direction, e.g., "width." A second indication 1504, for instance, is user selectable through use of a selection input and subsequent movement input to resize grid elements A, B, C, and D in a vertical direction, e.g., "height." The third indication 1506 is user selectable to resize grid elements "C" and "D" in a horizontal direction.

For this example, a grid factor graph 1002 defines grid factors to control a width of grid items "A" and "B" in which a width of "A" is defined as one third of a width of a row and a width of "B" is set as a remainder:

$$(X\_1 == (X\_3 - X\_0)/3);$$

$$(A\_W == X\_1 - X\_0);$$

$$(A\_W + B\_W == X\_3 - X\_0); \text{ and}$$

$$(B\_X == X\_1).$$

Accordingly, a user input including a selection input and a subsequent movement input until a width of the grid element "A" is one quarter of the row, a single grid factor of "X_1" is updated from:

15

$$(X\_1 == (X\_3 - X\_0)/3) \text{ to}$$

$$(X\_1 == (X\_3 - X\_0)/4).$$

Figure 16:
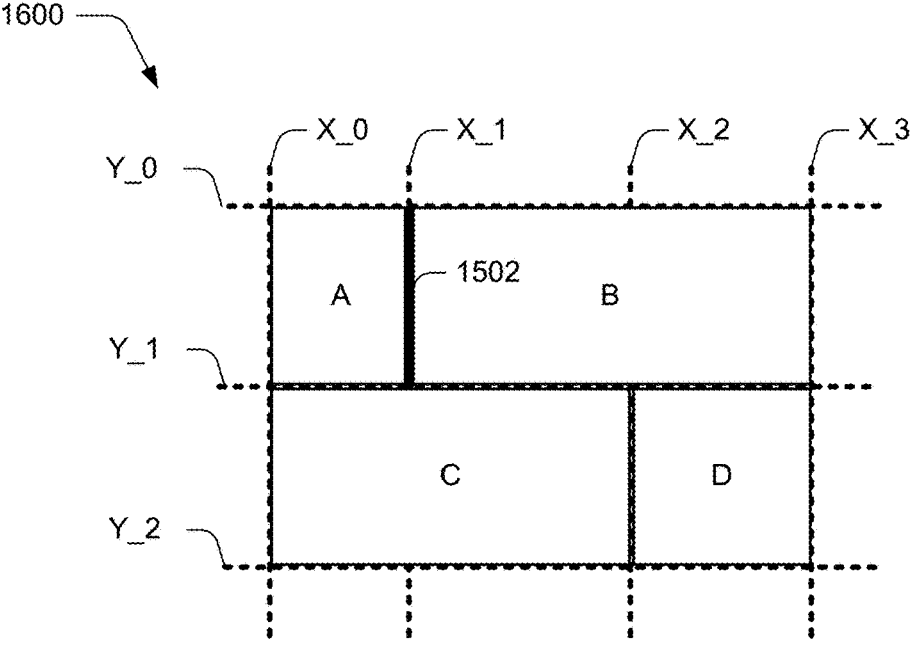
FIG. 16 illustrates an example implementation of a grid having grid lines and a plurality of grid items as being resized based on a user input received in FIG. 15.

Each of the other grid variables and grid factors remain unchanged. The grid factor graph resolution module 1012 then finds an assigned coordinate for each of the variables and adjusts a width of grid element "A" to one quarter of the row and a width of grid element "B" to the remainder. A result of which is then rendered, an example of which is depicted in FIG. 16 which illustrates an example implementation 1600 of a grid having grid lines and a plurality of grid items as being resized based on a user input received in FIG. 15.

Figure 17:
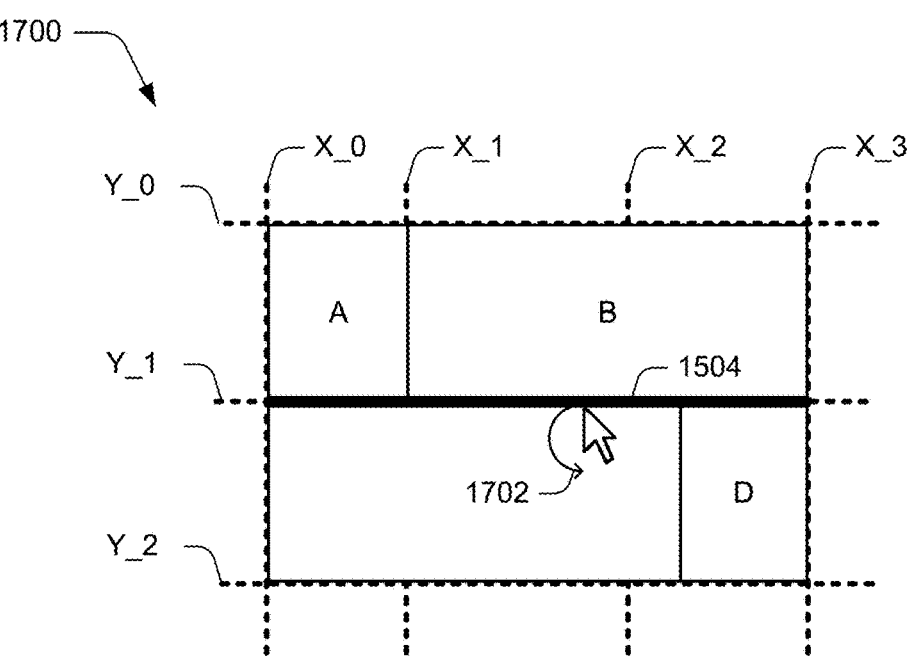
FIG. 17 depicts another example implementation of resizing a grid having grid lines and a plurality of grid items having indications that are user selectable to resize corresponding grid lines and/or grid items.

FIG. 17 depicts another example implementation 1700 of resizing a grid having grid lines and a plurality of grid items having indications that are user selectable to resize corresponding grid lines and/or grid items. Continuing with the previous examples of FIGS. 15 and 16, a user input 1702 is received involving a selection input selecting the second indication 1504 associated with a grid line "Y_1" and subsequent movement "downward" in a vertical direction in a user interface.

Figure 18:
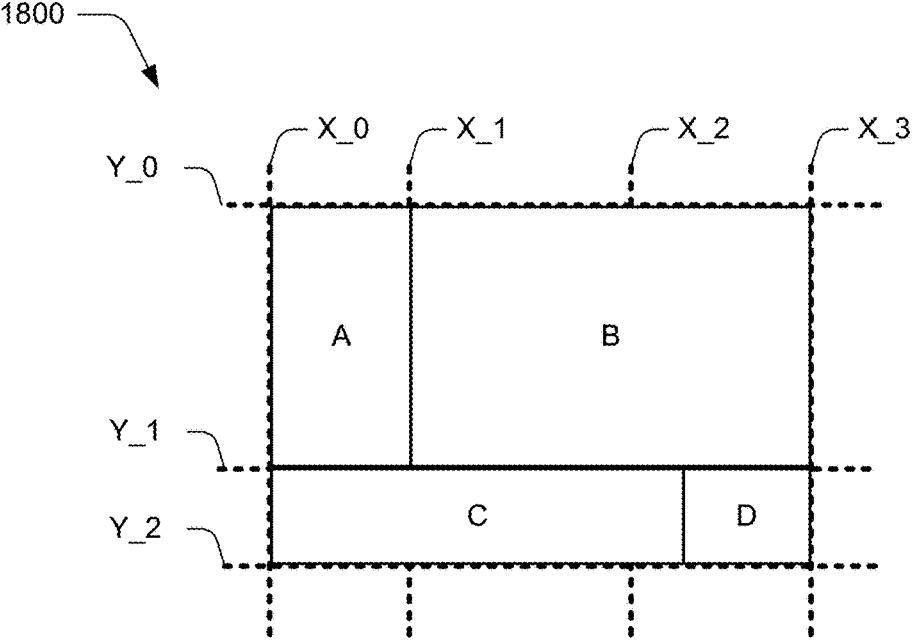
FIG. 18 which illustrates an example implementation of a grid having grid lines and a plurality of grid items as being resized based on a user input received in FIG. 17.

Accordingly, the grid factor graph 1002 is updated to reflect a new location of "Y_1." This causes resizing of each of the elements "A," "B," "C," and "D" by changing a grid factor associated with the grid line "Y_1," i.e., the constraint defined for the grid line in the grid factor graph 1002. A result of which is then rendered, an example of which is depicted in FIG. 18 which illustrates an example implementation 1800 of a grid having grid lines and a plurality of grid items as being resized based on a user input received in FIG. 17.

Figure 19:
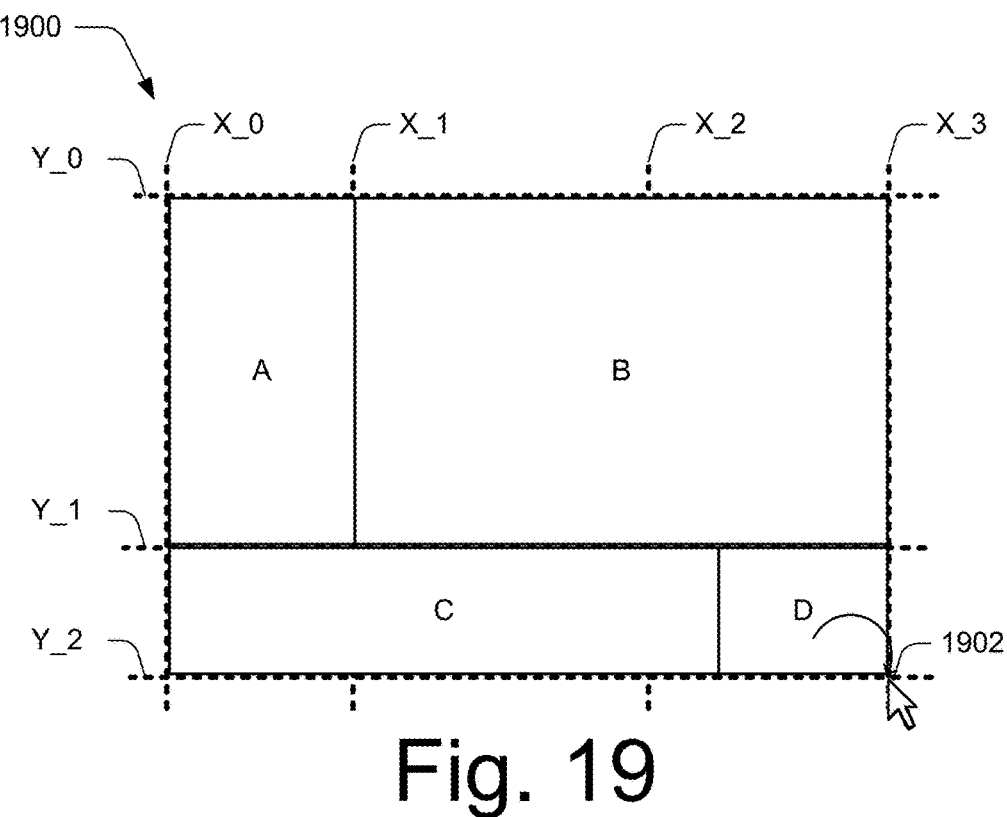
FIG. 19 depicts another example implementation of resizing an entirety of a grid to resize corresponding grid lines and/or grid items.

FIG. 19 depicts another example implementation 1900 of resizing an entirety of a grid to resize corresponding grid lines and/or grid items. As previously described, the grid structure control module 116 also supports resizing of the grid 118 as a whole, such as to increase or decrease sizes of spaces and grid items in response to a user input 1902 involving a selection input and subsequent movement input in the user interface.

Figure 20:
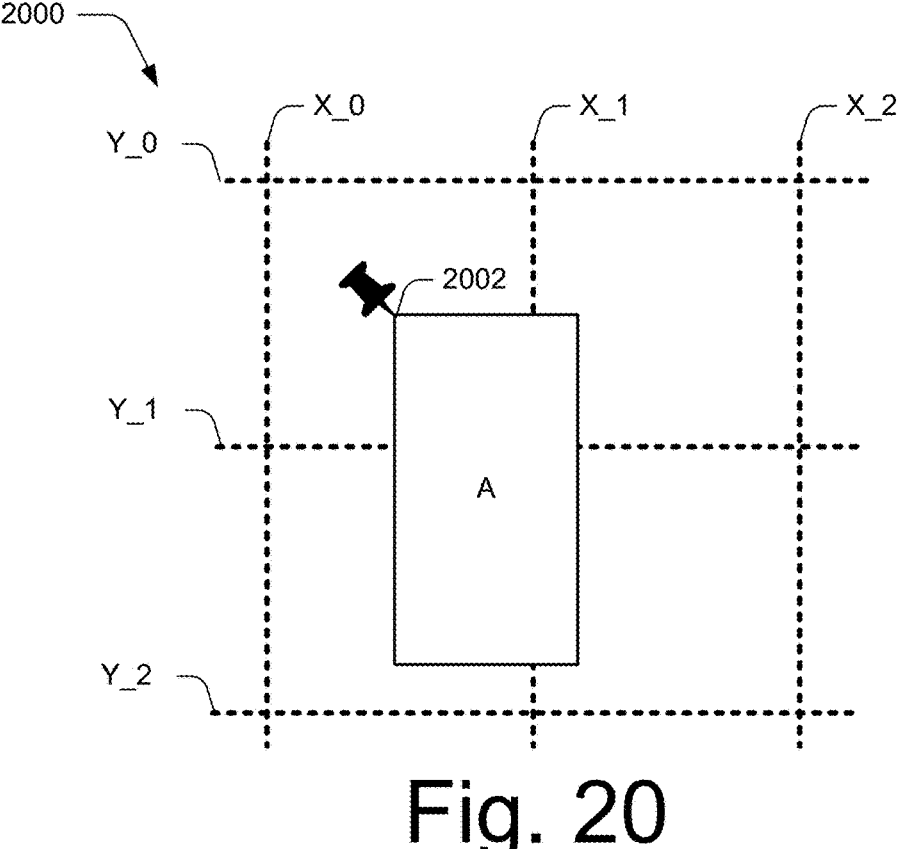
FIG. 20 depicts another example implementation of pinning a grid element to a location having a constrained relationship to a grid.

FIG. 20 depicts another example implementation 2000 of pinning a grid element to a location having a constrained relationship to a grid. Grid items, as previously described, may be located (e.g., pinned) in relation to a grid using a variety of constrained relationships. For example, a top-left corner of a grid item "A" may be pinned to a location 2002 at a center of a first grid cell by adding grid factors to a grid factor graph 1002:

$$A\_X == (X\_0 + X\_1)/2; \text{ and}$$

$$A\_Y == (Y\_0 + Y\_1)/2.$$

In this way, the location of the top left corner of the grid item "A" dynamically responds to changes in "X_0," "X_1," "Y_0," and "Y_1."

FIG. 21 is a flow diagram depicting a step-by-step procedure 2100 in an example implementation of operations performable by a processing device for accomplishing a result of grid factor graph generation, update, and resolution. Aspects the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm.

A constraint-based grid is presented for display in a user interface. The constraint-based grid has a structure defined using gridlines (block 2102). As shown in FIG. 10, for instance, a grid structure control module 116 displays grid lines 1004 forming a grid 118 in a user interface 110.

An input is received via the user interface 110 specifying a grid item disposed in relation to the constraint-based grid (block 2104). A grid item "A," for instance is specified at location 1008 with respect to the grid.

A grid factor graph 1002 is formed based on grid variables and grid factors. The grid factors defining constrained relationships of the grid variables to each other (block 2106). Continuing with the previous example, a grid factor graph generation module 1010 generates grid factors as specifying a location of the top left corner of the 1006 at respective coordinates that are constrained based on corresponding grid lines. An "X" coordinate of the location 1008, for instance, is defined as being constrained halfway between grid lines "X_0" and "X_1." Likewise, a "Y" coordinate of the location 1008 is defined as being constrained halfway between grid lines "Y_0" and "Y_1."

An edit is received to the constraint-based grid or the grid item via the user interface (block 2108). The edit, for instance, may specify movement of grid lines "X_0," "X_1," "Y_0," or "Y_1." Likewise, the edit may specify movement of the location 1008 with respect to the grid lines.

In response, the grid factor graph generation module 1010 updates the grid factor graph 1002 based on the edit (block 2110), e.g., to redefine the grid lines or location 1008 using corresponding grid factors. The constraint-based grid and the grid item are presented for display in the user interface by resolving the updated grid factor graph (block 2112) by the grid factor graph resolution module 1012. The grid factor graph resolution module 1012, for instance, employs Gaussian elimination to define coordinates of respective grid lines and locations of the grid items mathematically using linear equations defined for the grid factors. These coordinates are then used to render the grid items, e.g., with or without the grid lines. A variety of other examples are also contemplated.

Example System and Device

Figure 22:
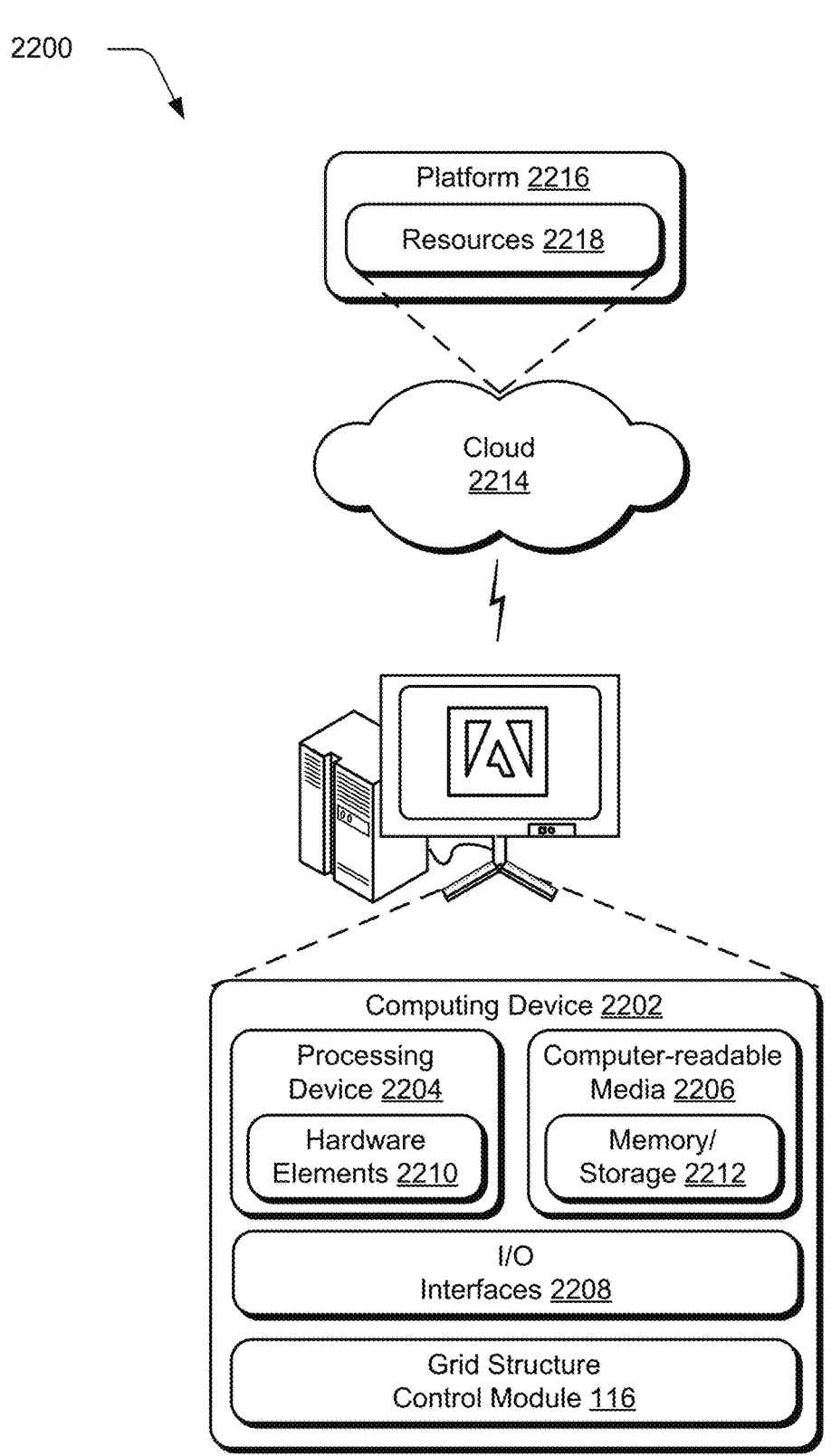
FIG. 22 illustrates an example system including various components of an example device that can be implemented as any type of computing device as described and/or utilize with reference to the previous figures to implement embodiments of the techniques described herein.

FIG. 22 illustrates an example system generally at 2200 that includes an example computing device 2202 that is representative of one or more computing systems and/or devices that implement the various techniques described herein. This is illustrated through inclusion of the grid structure control module 116. The computing device 2202 is configurable, for example, as a server of a service provider, a device associated with a client (e.g., a client device), an on-chip system, and/or any other suitable computing device or computing system.

The example computing device 2202 as illustrated includes a processing device 2204, one or more computer-readable media 2206, and one or more I/O interface 2208 that are communicatively coupled, one to another. Although not shown, the computing device 2202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 2204 is representative of functionality to perform one or more operations using hardware. Accordingly, the processing device 2204 is illustrated as including hardware element 2210 that is configurable as processors, functional blocks, and so forth. This includes implementation in hardware as an application specific integrated circuit or other logic device formed using one or more semiconductors. The hardware elements 2210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 2206 is illustrated as including memory/storage 2212 that stores instructions that are executable to cause the processing device 2204 to perform operations. The memory/storage 2212 represents memory/storage capacity associated with one or more computer-readable media. The memory/storage 2212 includes volatile media (such as random access memory (RAM)) and/or nonvolatile media (such as read only memory (ROM), Flash memory, optical disks, magnetic disks, and so forth). The memory/storage 2212 includes fixed media (e.g., RAM, ROM, a fixed hard drive, and so on) as well as removable media (e.g., Flash memory, a removable hard drive, an optical disc, and so forth). The computer-readable media 2206 is configurable in a variety of other ways as further described below.

Input/output interface(s) 2208 are representative of functionality to allow a user to enter commands and information to computing device 2202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 2202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 2202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2210 and computer-readable media 2206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 2210. The computing device 2202 is configured to implement particular instructions and/or functions corresponding to the software and/or hardware modules. Accordingly, implementation of a module that is executable by the computing device 2202 as software is achieved at least partially in hardware, e.g., through use of computer-readable storage media and/or hardware elements 2210 of the processing device 2204. The instructions and/or functions are executable/operable by one or more articles of manufacture (for example, one or more computing devices 2202 and/or processing devices 2204) to implement techniques, modules, and examples described herein.

The techniques described herein are supported by various configurations of the computing device 2202 and are not limited to the specific examples of the techniques described herein. This functionality is also implementable all or in part through use of a distributed system, such as over a "cloud" 2214 via a platform 2216 as described below.

The cloud 2214 includes and/or is representative of a platform 2216 for resources 2218. The platform 2216 abstracts underlying functionality of hardware (e.g., servers) and software resources of the cloud 2214. The resources 2218 include applications and/or data that can be utilized while computer processing is executed on servers that are remote from the computing device 2202. Resources 2218 can also include services provided over the Internet and/or through a subscriber network, such as a cellular or Wi-Fi network.

The platform 2216 abstracts resources and functions to connect the computing device 2202 with other computing devices. The platform 2216 also serves to abstract scaling of resources to provide a corresponding level of scale to encountered demand for the resources 2218 that are implemented via the platform 2216. Accordingly, in an interconnected device embodiment, implementation of functionality described herein is distributable throughout the system 2200. For example, the functionality is implementable in part on the computing device 2202 as well as via the platform 2216 that abstracts the functionality of the cloud 2214.

In implementations, the platform 2216 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, an input via a user interface, the user interface displaying a grid having a plurality of grid cells;

determining, by the processing device, whether the input corresponds to a first said grid cell of the grid;

responsive to determining by the processing device the input corresponds to the first said grid cell, moving a first edge of the first said grid cell and a second edge of a second said grid cell as following the input, the second edge is disposed opposite and proximal to the first edge, the first said grid cell included in a row or column of the grid with a third said grid cell that is independent of the second said grid cell and in which the moving is performed independent of the third said grid cell.

2. The method as described in claim 1, wherein the input corresponds to the first said grid cell and the moving of the first edge of the first said grid cell and the second edge of the second said grid cell of the input includes:

determining the first edge of the first said grid cell as corresponding to the input; and identifying the second edge of the second said grid cell based on an axis defined by a direction of movement of the input.

3. The method as described in claim 2, further comprising detecting a third edge of a third said grid cell overlaps the second edge of the second said grid cell along the direction, and wherein the moving includes moving the first edge, the second edge, and the third edge together as following the movement input as received via the user interface.

4. The method as described in claim 1, further comprising displaying a grid cell indication in the user interface that the first said grid cell is selected responsive to the determining the input corresponds to the first said grid cell.

5. The method as described in claim 4, wherein the grid cell indication includes at least one handle that is user selectable and the input is further detected based on user interaction with the at least one handle.

6. The method as described in claim 1, further comprising:

determining, by the processing device, whether the input corresponds to a divider disposed between said grid cells; and responsive to determining by the processing device the input corresponds the divider, moving edges of one or more said grid cells in the user interface as following the input, the edges of the one or more said grid cells are disposed within a threshold distance of the divider.

7. The method as described in claim 6, wherein the divider defines an axis in the grid and does not intersect the one or more said grid cells in the grid.

8. The method as described in claim 6, wherein the moving of the one or more said grid cells in the user interface that are disposed within the threshold distance of the divider includes:

identifying one or more said grid cells having edges that are disposed within a threshold distance of the divider and that the one or more said grid cells do not intersect the divider; and moving the edges of the one or more said grid cells together as following a movement input received via the user interface.

9. The method as described in claim 6, further comprising displaying a divider indication of the divider in the user interface responsive to the determining the input corresponds the divider.

10. The method as described in claim 6, further comprising displaying a grid indication of selection of the grid as a whole in the user interface responsive to the determining the input corresponds to the input corresponds the divider, the grid indication supporting user interaction to resize the plurality of cells together.

11. A computing device comprising:

a processor; and a computer-readable storage medium storing instructions that, responsive to execution by the processor, causes the processor to perform operations including:

receiving an input as corresponding to a first grid cell of a plurality of grid cells forming a grid in a user interface;

identifying a second edge of a second grid cell of the plurality of grid cells, the second edge disposed along a direction in the user interface that is orthogonal to a first edge of the first grid cell;

detecting a third edge of a third grid cell of the plurality of grid cells as overlapping the second edge of the second grid cell along the direction; and moving the first, second, and third edges together as following the input received via the user interface independent of a fourth grid cell of the plurality of grid cells disposed in a row or column of the grid with the first grid cell and independent of second and third grid cells.

12. The computing device as described in claim 11, wherein the identifying the second edge is based on identifying the second edge as disposed as opposite to the first edge in the user interface and overlaps the first edge as orthogonal to at least a portion of the first edge.

13. The computing device as described in claim 11, wherein the operations further comprise displaying a grid cell indication in the user interface, the grid cell indicating that the first grid cell is selected responsive to detecting the input corresponds to the first grid cell.

14. The computing as described in claim 13, wherein the grid cell indication includes at least one handle that is user selectable and the input is further detected based on user interaction with the at least one handle.

15. The computing device as described in claim 11, further comprising determining whether the input corresponds to the first grid cell and wherein the determining the first edge of the first grid cell corresponds to the input, the identifying, the detecting, and the moving are performed responsive to the determining the input corresponds to the first grid cell.

16. The computing device as described in claim 15, further comprising determining the input corresponds to a divider in the grid, and responsive to the determining the input corresponds the divider:

identifying one or more grid cells of the plurality of grid cells having edges that are disposed within a threshold distance of the divider and the one or more grid cells do not intersect the divider; and moving the edges of the one or more grid cells together as following a movement input received via the user interface.

17. One or more computer-readable storage media storing instructions that, responsive to execution by a processing device, causes the processing device to perform operations comprising:

detecting an input with respect to a display of a grid having a plurality of grid cells in a user interface; and activating a divider edit mode responsive to determining the input corresponds to a divider, the divider edit mode configured to support movement of edges of one or more grid cells of the plurality of grid cells in the user interface as following the input, the edges of the one or more grid cells disposed within a threshold distance of the divider, the movement independent of cells of the plurality of grid cells included with the one or more grid cells in a row or column of the grid that do not include edges disposed within the threshold distance.

18. The one or more computer-readable storage media as described in claim 17, further comprising activating a grid cell edit mode responsive to determining the input involves selection of a first grid cell of the plurality of grid cells in the user interface, the grid cell edit mode configured to support movement of a first edge of the first grid cell and a second edge of a second grid cell of the plurality of grid cells as following the input, the second edge is disposed opposite and proximal to the first edge.

19. The one or more computer-readable storage media as described in claim 18, wherein the grid cell mode is configured to detect an overlap of a first edge with a second edge based on an axis defined by a direction of movement of the input.

20. The one or more computer-readable storage media as described in claim 18, wherein the one or more grid cells are not intersected by the divider.

* * * * *